(12) United States Patent
Brown

(10) Patent No.: US 7,267,071 B2
(45) Date of Patent: Sep. 11, 2007

(54) APPARATUSES AND METHODS USEFUL FOR CENTERING WATERCRAFT

(76) Inventor: Curtis W. Brown, 11004 Beach Rd., Leander, TX (US) 78641

( * ) Notice: Subject to any disclaimer, the term of this patent is extended or adjusted under 35 U.S.C. 154(b) by 0 days.

(21) Appl. No.: 11/422,556

(22) Filed: Jun. 6, 2006

(65) Prior Publication Data

US 2006/0207491 A1   Sep. 21, 2006

Related U.S. Application Data

(63) Continuation of application No. 10/771,644, filed on Feb. 4, 2004, now Pat. No. 7,055,449.

(51) Int. Cl.
*B63B 35/44* (2006.01)
*B60P 3/10* (2006.01)
*B63C 3/06* (2006.01)

(52) U.S. Cl. .......................... 114/263; 114/44; 114/219; 114/344; 280/414.1; 405/3

(58) Field of Classification Search .................. 114/45, 114/48, 50–53, 219, 344; 280/414.1; 414/532, 414/534; 405/1, 3–6, 218
See application file for complete search history.

(56) References Cited

U.S. PATENT DOCUMENTS

| | | | |
|---|---|---|---|
| 704,358 A | 7/1902 | McCullough | 405/7 |
| 1,385,487 A | 7/1921 | Kennison | 405/7 |
| 2,885,989 A | 5/1959 | Miller | 114/219 |
| 3,026,981 A | 3/1962 | Youtie | 193/35 R |
| 3,447,815 A | 6/1969 | West | 280/144 |
| 3,608,754 A | 9/1971 | Park | 214/84 |
| 3,977,030 A * | 8/1976 | Ringdal | 114/375 |
| 4,094,527 A | 6/1978 | Miller | 280/141 R |
| 4,099,279 A | 7/1978 | Park | 114/344 |
| 4,103,925 A | 8/1978 | Palamara | 280/414 A |
| 4,209,279 A | 6/1980 | Aasen | 414/534 |
| 4,242,768 A | 1/1981 | Winsett | 114/344 |
| 4,340,332 A | 7/1982 | Davies | 414/467 |
| 4,500,249 A | 2/1985 | Johansson | 414/534 |
| 4,529,217 A | 7/1985 | Wood | 280/414.1 |
| 4,586,725 A | 5/1986 | Jeanson | 280/414.1 |
| D288,795 S | 3/1987 | Toppero, Jr. | D12/106 |
| 4,684,145 A | 8/1987 | Tingley | 280/414.1 |
| 4,715,768 A | 12/1987 | Capps | 414/535 |
| 4,836,569 A | 6/1989 | Godbersen | 280/414.1 |
| 4,895,387 A | 1/1990 | Hawkins et al. | 280/414.1 |
| 5,004,260 A | 4/1991 | Smyly, Sr. | 280/414.1 |
| 5,013,206 A | 5/1991 | Ernst et al. | 414/483 |
| 5,133,571 A | 7/1992 | Urbank | 280/414.1 |
| 5,140,922 A | 8/1992 | Bowman et al. | 114/45 |

(Continued)

OTHER PUBLICATIONS

"Easytow: large trailers," Easytow Boat Trailers, http://www.easytow.com.au/large.html, printed on May 4, 2003.

(Continued)

*Primary Examiner*—Jesús D. Sotelo
(74) *Attorney, Agent, or Firm*—Fulbright & Jaworski L.L.P.

(57) ABSTRACT

Apparatuses and methods useful for helping to center watercraft—such as personal watercraft, ski boats, fishing boats, luxury boats, and the like—as they are docked (such as on trailers or watercraft-lifting systems), especially in rough waters and/or strong crosswinds.

20 Claims, 17 Drawing Sheets

U.S. PATENT DOCUMENTS

| | | |
|---|---|---|
| 5,165,706 A | 11/1992 | Fond ........................ 280/414.1 |
| 5,195,767 A | 3/1993 | Des Roches ............. 280/414.1 |
| 5,228,713 A | 7/1993 | Kovach ................... 280/414.1 |
| 5,281,055 A | 1/1994 | Netzke et al. .............. 405/219 |
| 5,299,903 A | 4/1994 | Kesselring ................. 414/534 |
| 5,360,226 A | 11/1994 | Gussler, Jr. et al. ..... 280/414.1 |
| 5,682,833 A | 11/1997 | Eva, III et al. ............. 114/263 |
| 5,890,835 A | 4/1999 | Basta et al. ..................... 405/3 |
| 6,477,973 B1 | 11/2002 | Kobas ........................ 114/219 |

OTHER PUBLICATIONS

Levers, http://www.automata.co.uk/leavers.htm, printed May 14, 2003.

"Tiger boat docks and lifts," HydroHoist Floating Boat Lifts, http://www.tigerboatdocks,com/liftf.htm, printed on Nov. 7, 2003.

"Tiger boat docks and lifts," HydroHoist Floating Boat Lifts, http://www.tigerboatdocks.com/liftu.htm, printed on Nov. 7, 2003.

"Trailer," Classic Whaler: Boston Whaler, http://continuouswave.com/whaler/reference/trailering/trailer.html, printed May 4, 2003.

Boat-trailers.org, http://www.boat-trailers.org/, printed on May 4, 2003.

2 images printed from http://www.gojetdock.com less than 1 year prior to filing date of this application.

* cited by examiner

APPARATUSES AND METHODS USEFUL FOR CENTERING WATERCRAFT

CROSS-REFERENCE TO RELATED APPLICATION

This is a continuation of application Ser. No. 10/771,644, now U.S. Pat. No. 7,055,449, which was filed Feb. 4, 2004 and which is incorporated by reference.

BACKGROUND OF THE INVENTION

1. Field of the Invention

The invention relates generally to the field of watercraft. More particularly, it relates to apparatuses and methods useful for helping to center watercraft—such as personal watercraft, ski boats, fishing boats, luxury boats, and the like—as they are docked (such as on trailers or watercraft-lifting systems).

2. Description of Related Art

Some trailers for loading and transporting boats and other watercraft are equipped with bunks positioned along the length of a portion of the trailer. As the boat or other watercraft is driven onto the trailer for loading, the hull of the craft contacts the bunks and ultimately rests on them once the craft is out of the water. The bunks help guide a craft that is loaded in calm waters, but they are not very useful for centering a craft that is loaded in rough waters and/or strong crosswinds. A craft loaded during such conditions can get banged around by the bunks and potentially damaged.

Some trailers use rollers (e.g., wobble rollers and keel rollers) instead of, or in addition to, bunks. Rollers are not much more helpful than bunks at centering a craft that is loaded in rough waters and/or strong crosswinds. Furthermore, rollers may damage the hull of the craft because of the large amount of force that can apply to a small area of the hull.

A number of trailer guides and mechanisms designed to make boat loading easier have been disclosed. See U.S. Pat. Nos. 4,209,279; 3,608,754; 3,026,981; 3,447,815; 5,228,713; 5,013,206; 4,242,768; 4,715,768; 4,094,527; 4,099,279; 5,299,903; 4,500,249; and 4,529,217, all of which are incorporated by reference. While each of these disclosures purport to solve problems associated with boat loading, the inventor has discovered that none is completely satisfactory.

Some watercraft, especially boats, are stored on the water instead of being trailered. Watercraft that are stored on the water are generally lifted out of the water using a lifting mechanism of some kind in order to minimize damage to the craft that might otherwise occur (i.e., corrosion from the water, damage due to rough waters, etc.). Some lifting mechanisms involve lift tanks to which bunks are attached. Although lift tanks are generally more protected from rough waters and/or crosswinds than are trailers, such conditions can still make steering a craft into place over a lift tank (or other watercraft-lifting system) difficult. The bunks attached to such lift tanks are generally not satisfactory at helping to center or centering the craft in the appropriate position over the tanks.

SUMMARY OF THE INVENTION

The inventor has created unique apparatuses and methods that make it easier to center watercraft, especially in crosswinds and/or rough waters. Watercraft docking should be easier and faster using the present apparatuses and methods than has traditionally been possible, especially in rough waters and/or crosswinds.

Certain embodiments of the present apparatuses comprise an arm that floats in water and has (a) a surface that is configured to contact a watercraft hull, (b) a length, and (c) a passageway that is not centered along the length.

Certain embodiments of the present apparatuses comprise an arm that floats in water and that has a surface that is configured to (meaning configured to at least) contact a watercraft hull. The surface has a pre-contact shape that is either substantially flat or bowed inwardly, and the arm is configured to be pivotally coupled to a watercraft docking structure. Watercraft docking structures include boat trailers, personal watercraft trailers, and watercraft-lifting systems such as a lifting system that utilizes lifting tanks, to name a few.

Certain embodiments of the present apparatuses comprise a pair of float arms configured to help center a watercraft having a longitudinal watercraft axis. Each float arm has a passageway that is substantially parallel to the longitudinal watercraft axis.

Certain embodiments of the present apparatuses are configured to be coupled to any suitable watercraft docking structure. Certain embodiments of the present apparatuses actually include the watercraft docking structures. Other embodiments of the present apparatuses, and details associated with those embodiments, are described below and shown in the figures.

Certain embodiments of the present methods include, but are not limited to, contacting a watercraft (e.g., the hull of a watercraft) with pivoting float arms positioned on different sides of the watercraft, the contacting tending to center the watercraft over a watercraft docking structure, such as a trailer or a watercraft-lifting system.

Additional embodiments of the present structures and methods, and details associated with those embodiments, are described below.

BRIEF DESCRIPTION OF THE DRAWINGS

The following drawings illustrate by way of example and not limitation. The use of identical reference numerals does not necessarily indicate an identical structure. Rather, the same reference numeral may be used to indicate a similar feature or a feature with similar functionality.

DESCRIPTION OF ILLUSTRATIVE EMBODIMENTS

Figure 1:
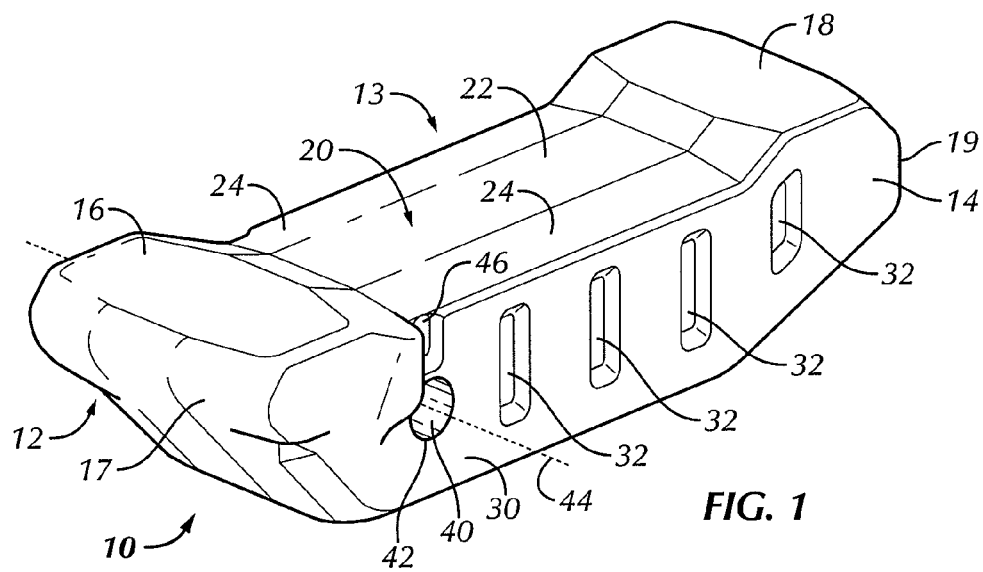
FIG. 1 is a perspective view of one of the present float arms.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus (e.g., an arm) or method that "comprises," "has," or "includes" one or more elements or steps possesses those one or more elements or steps, but is not limited to possessing only those one or more elements or steps. Likewise, an element of an apparatus or a step of a method that "comprises," "has," or "includes" one or more features possesses those one or more features, but is not limited to possessing only those one or more features. Furthermore, a structure that is configured in a certain way must be configured in at least that way, but also may be configured in a way or ways that are not listed.

The terms "a" and "an" are defined as one or more than one unless this disclosure explicitly requires otherwise. The term "coupled" is defined as connected, although not necessarily mechanically, and not necessarily directly. The term "configured" is defined by example as follows: a frame, for example, that is "configured" to be coupled to a trailer, for example, is structurally adapted for connection to that trailer through any suitable means. The term "substantially" is defined as at least close to (and can include) a given value or state (preferably within 10% of, more preferably within 1% of, and most preferably within 0.1% of). The present float arms are defined, in a broad respect, as structures that float in water.

A. The Present Float Arms

The present apparatuses include one or more of the present float arms. Two float arms are typically described as a "pair" of float arms. FIGS. 1-6 are drawn to scale (in terms of proportions), and show different views of a preferred embodiment of the present float arms. The following description pertains to the preferred embodiment, unless described otherwise.

Float arm 10 has an inside end, designated generally by 12, an outside end, designated generally by 14, and a middle portion, designated generally by 13. Both inside end 12 and outside end 14 are configured to be positioned such that they can contact, to some degree, a watercraft hull. Specifically, inside end 12 includes an inside end top surface 16 that is configured to contact a watercraft hull. Similarly, outside end 14 includes an outside end top surface 18 that is configured to contact a watercraft hull. As shown in the figures, both of these surfaces (or either of them) can be substantially flat. Moreover, these surfaces (or either of them) can have a pre-contact shape that is substantially flat, meaning that they are substantially flat prior to contact with a watercraft hull. Rollers (e.g., wobble rollers and keel rollers), in contrast, do not have surfaces that are configured to contact a watercraft hull and that are substantially flat, nor do they have surfaces that are configured to contact a watercraft hull and that have a pre-contact shape that is substantially flat.

Alternatively, inside end top surface 16 and/or outside end top surface 18 may be configured with one or more curves such that at least portion of each is bowed inwardly to best fit a given hull. Moreover, a portion of each of these surfaces (or either of them) can have a pre-contact shape that is bowed inwardly, meaning a portion of those surfaces has some inward bowing prior to contact with a watercraft hull. In contrast, rollers (e.g., wobble rollers and keel rollers) do not have a surface (or a portion of a surface) that is configured to contact a watercraft hull and that is bowed inwardly, nor do they have a surface (or a portion of a surface) that is configured to contact a watercraft hull and has a pre-contact shape that is bowed inwardly.

It may prove to be desirable in some embodiments to configure the contact areas of float arm 10—e.g., inside end top surface 16 and outside end top surface 18—to have an outward bow. Such a configuration is consistent with certain embodiments of the present float arms.

Certain embodiments of the present float arms, including the preferred embodiment shown in FIGS. 1-6, may be characterized as having one or more non-rolling, or non-rotating, contact areas (or watercraft hull contact areas), or surfaces. Inside end top surface 16 and outside end top surface 18 are examples of such contact areas. Rollers, in contrast, do not possess such contact areas.

Certain embodiments of the present float arms may possess contact areas (e.g., watercraft hull contact areas) that do roll, or turn, as a watercraft hull moves along them. For example, in certain embodiments, although not shown, a bar may be embedded in middle portion 13. The bar may extend beyond middle portion 13, and serve as a structure around which inside end 12 and outside end 14 rotate. The rotation may be achieved by providing inside end 12 and outside end 14 with a passageway running in the direction of the length of float arm 10. The passageways of inside end 12 and outside end 14 may then be slipped over the protruding bar (like a bicycle wheel over an axle), and the two ends may be permitted to rotate about such a bar. The width and length of such a float arm may be very similar to what is shown in FIGS. 1-6.

Figure 3:
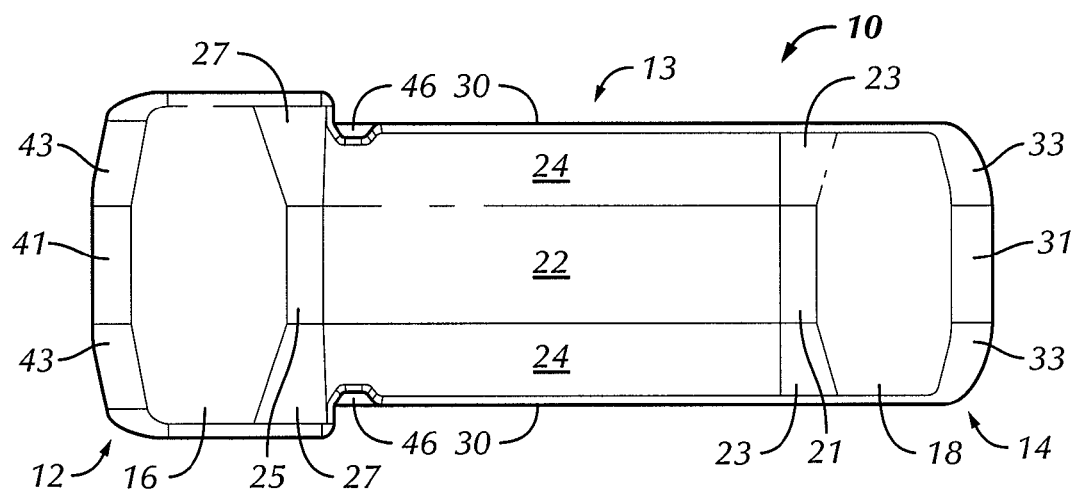
FIG. 3 is a top view of the float arm shown in FIG. 1.

Inside end top surface 16 and/or outside end top surface 18 of the preferred embodiment are configured such that each is generally wider than long (see, e.g., FIG. 3). In contrast, the portions of a traditional roller that contact a watercraft hull are generally longer than they are wide. Of course, it is possible, in other embodiments, to have an inside end top surface 16 and/or an outside end top surface 18 that are configured such that each is generally longer than wide. Furthermore, float arm 10 is configured such that inside end 12 (and, more specifically, inside end top surface 16) contacts a watercraft hull nearer the hull's center than outside end 14 (and, more specifically, outside end top surface 18).

The preferred embodiment of float arm 10 includes a middle portion top surface—designated generally by 20—that extends between inside end top surface 16 and outside end top surface 18. Middle portion top surface 20 includes central portion 22, and side portions 24. Both central portion and side portions 22 and 24 are substantially flat, although other configurations are possible in other embodiments. Central portion 22 lies in a plane that is substantially parallel to the plane in which inside end top surface 16 and outside end top surface 18 lie (in other embodiments, inside end top surface 16 and outside end top surface 18 do not lie in the same plane). Side portions 24 slope downwardly from central portion 22. The difference in height between central portion 22 and inside and outside end top surfaces 16 and 18 may allow float arm 10 to clear one or more chines of a watercraft hull.

As FIGS. 1 and 3 show, slanted surfaces connect inside and outside end top surfaces 16 and 18 with middle portion top surface 20. Specifically, outside central slanted top surface 21 extends from outside end top surface 18 to central portion 22, and outside slanted top surfaces 23 extend from outside end top surface 18 to side portions 24. Inside central slanted top surface 25 extends from inside end top surface 16 to central portion 22, and inside slanted top surfaces 27 extend from inside end top surface 16 to side portions 24.

Slanted surfaces also connect inside and outside top surfaces 16 and 18 to the end-most portions of inside end 12 and outside end 14. Starting first with outside end 14, outer central surface portion 31 and outer side surface portions 33 each extend from outside end top surface 18 to outside edge 19. Similarly, inner central surface portion 41 and outer side surface portions 43 each extend from inside end top surface 16 to curved inside edge 17.

Figure 4:
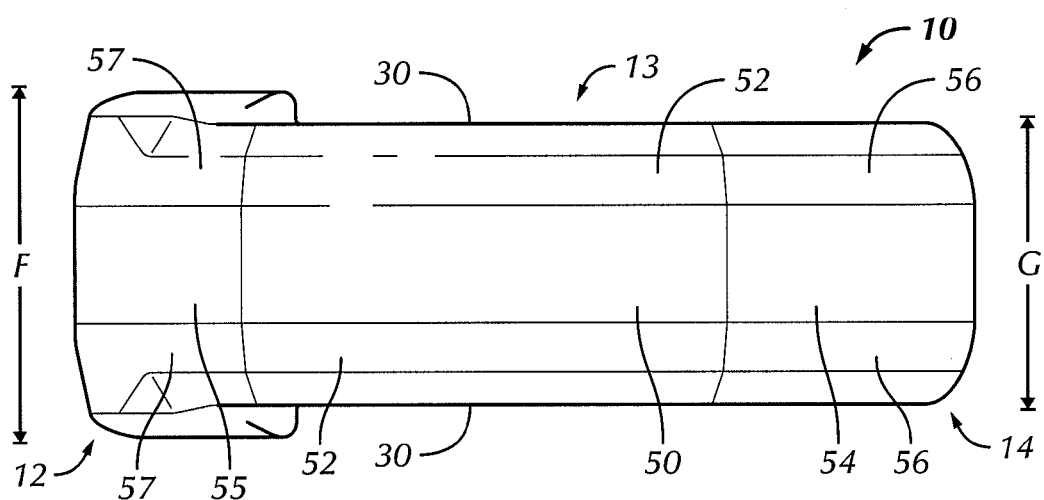
FIG. 4 is a bottom view of the float arm shown in FIG. 1.
Figure 5:
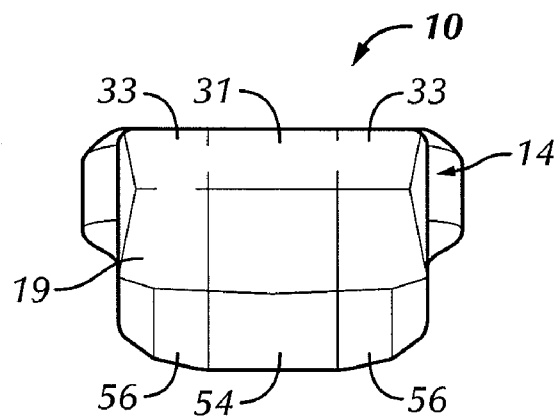
FIG. 5 is an outside end view of the float arm shown in FIG. 1.
Figure 6:
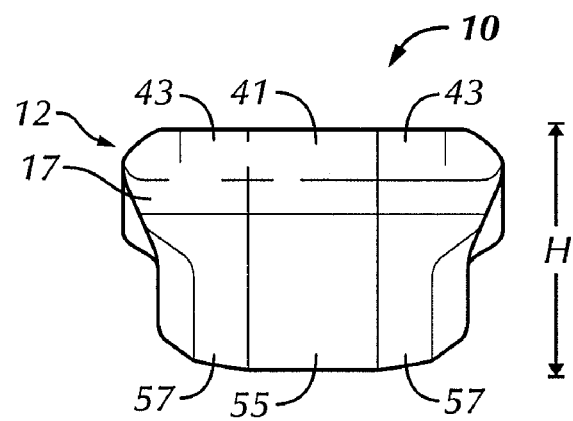
FIG. 6 is an inside end view of the float arm shown in FIG. 1.

The bottom of the preferred embodiment of float arm 10 is shown in FIG. 4. The bottom includes a central bottom surface portion 50 that is substantially flat (although other configurations are possible in other embodiments) and side bottom surface portions 52 that extend upwardly away from central bottom surface portion 50 at an angle. The bottom of the preferred embodiment angles upwardly at inside and outside ends 12 and 14. The outside bottom surface portion includes outside central slanted bottom surface 54, which extends upwardly from central bottom surface portion 50, and outside slanted bottom surfaces 56, which extend upwardly from side bottom surface portions 52. The inside bottom surface portion includes inside central slanted bottom surface 55, which extends upwardly from central bottom surface portion 50, and inside slanted bottom surfaces 57, which extend upwardly from side bottom surface portions 52.

Float arm 10 includes side surfaces 30, both of which can be identical in configuration (like the embodiment shown in FIGS. 1-6). In the preferred embodiment, side surfaces 30 are substantially flat, although other configurations may be used with other embodiments. Side surface 30 may each have strengthening recesses 32 that are oriented substantially perpendicular to the length of float arm 10. The strengthening recesses serve to stiffen side surfaces 30 of float arm 10. An exemplary depth for strengthening recesses 32 is ¾ inches.

Float arm 10 also includes a passageway 40 that extends through float arm 10 at an angle that is substantially perpendicular to its length. Passageway 40 extends between openings 42 positioned in side surfaces 30 of float arm 10. Axis 44 runs through passageway 40, and serves as an axis around which float arm 10 can pivot in use. A bar may be placed through passageway 40, as shown in other figures and discussed below, such that float arm 10 is capable of pivoting about that bar, and, more specifically, about axis 44 running through the bar and passageway 40. The placement of passageway 40 in float arm 10 is one manner of configuring float arm 10 to be pivotally coupled to something (e.g., a bar). Openings 42 and passageway 40 may be, for example, 2 inches in diameter.

Figure 2:
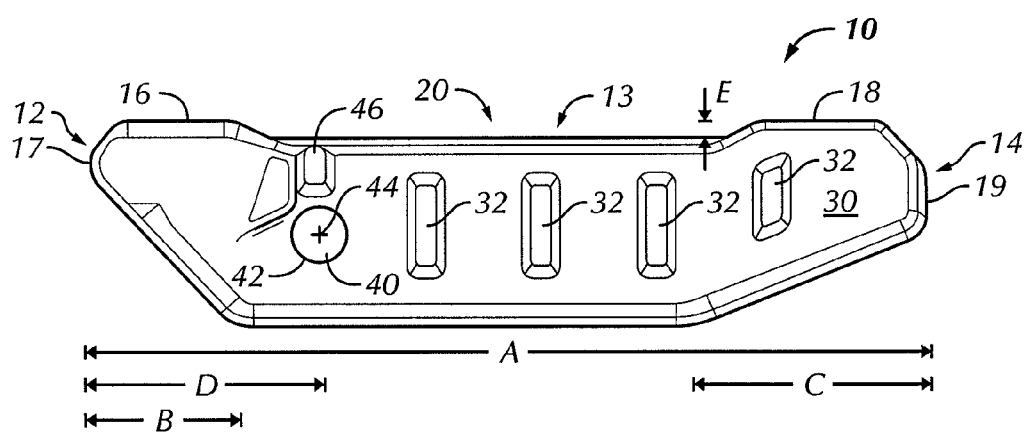
FIG. 2 is a front view (showing a side) of the float arm shown in FIG. 1.

As FIGS. 1 and 2 show, passageway 40 may be off-centered along the length (dimension A) of float arm 10. In this respect, float arm 10 may be characterized as having a structure (e.g., passageway 40, or the wall defining passageway 40) that is configured to be pivotally coupled to a watercraft docking structure (e.g., through a frame), where the structure is off-centered (i.e., not centered) along the length of float arm 10. More specifically, float arm 10 may be characterized as having a structure (e.g., passageway 40, or the wall defining passageway 40) that spans the width of a portion of float arm 10 and that is configured to be pivotally coupled to a watercraft docking structure (e.g., a frame), where the structure is off-centered along the length of float arm 10.

As a result of positioning passageway 40 to the left of center (as shown in FIG. 2), less than half (e.g., approximately ⅓ using the preferred configuration of float arm 10 shown in FIGS. 1 and 2) of the force exerted by a watercraft on a given float arm 10 will be countered by inside end top surface 16 and more than half (e.g., approximately ⅔ using the preferred configuration of float arm 10 shown in FIGS. 1 and 2) of the force exerted by a watercraft on that float arm will be countered by outside end top surface 18.

The embodiment of passageway 40 shown in FIGS. 1 and 2 is completely contained within a portion of float arm 10. However, in other embodiments of the present float arms, it will be understood by those of ordinary skill in the art, based on this disclosure, that passageway 40 may, itself, be open to a slot or other structure (e.g., another passageway), such that passageway 40 is not completely contained within a portion of float arm 10. For example, one of the present float arms may be provided with a second passageway (not shown in the figures) that communicates with passageway 40 and extends to central portion 22 of middle portion top surface 20.

Each side surface 30 may also includes a strengthening recess 46 that is positioned above opening 42. Strengthening recess 46 improves the strength of float arm 10 in the region of opening 42, making it less likely that opening 42 will be damaged over time. An exemplary depth for strengthening recess 46 is ¾ inches.

As FIGS. 3 and 4 show, inside end 12 has a width that is greater than the width of middle portion 13 and outside end 14. In some embodiments of float arm 10, middle portion 13 and outside end 14 may have different widths. The greater width results in more surface area contact between inside end top surface 16 and the watercraft hull.

Exemplary dimensions that may be used to construct one of the present float arms are: A may be 31 to 33 inches, including 32 inches; B may be 5 to 6 inches, including 5 ½ inches; C may be 9 to 10 inches, including 9½ inches; D may be 9 to 10 inches, including 9½ inches; E may be ¾ inches; F may be 11 to 12 inches, including 11½ inches; G may be 8 to 10 inches, including 9 inches; H may be 8 to 9 inches, including 8½ inches.

Although the transitions between different surface portions of the preferred embodiment of float arm 10 have been depicted using lines that typically represent changes of angle, those of ordinary skill in the art should understand that those transitions may be smooth transitions, such as those that would normally occur using suitable manufacturing techniques like blow molding, or the like.

In certain embodiments, the present float arms can be constructed to be sufficiently buoyancy that the frame to which they are coupled (e.g., pivotally) does not sink in water. The present float arms may be made of any suitable material, or combination of materials, that satisfy the applicable buoyancy conditions, which will depend to at least some degree on the size of the craft and the size of the frame. The present float arms also may be sufficiently smooth or otherwise configured so as not to mark up or damage the hull of the craft.

The present float arms may be made completely, or substantially completely, from a number of different materials, including synthetic material. A float arm made substantially completely from a synthetic material is one made from material that is substantially completely synthetic material. This does not mean that the float arm is a substantially completely solid piece of material. A polymer may serve as the synthetic material, and the polymer may be polyethylene (such as high density polyethylene) or urethane. The material that is used is preferably virgin material when a polymer is concerned, but may also be recycled material, provided the requisite buoyancy for the chosen application is achieved. The present float arms that are made of a polymer, such as polyethylene, may be manufactured using the well-known process of blow molding. Four pounds of polyethylene may be used to create the embodiment of float arm 10 shown in FIGS. 1-6 through blow molding. The thickness of the resulting wall of material that defines the shape of float arm 10 may be between 3/16 inches and 1/4 inches. Urethane foam may be injected into one of the present hollow float arms to increase the stiffness of float arm. Roto molding may be used as an alternative to blow molding. Furthermore, those of ordinary skill in the art will understand that other techniques also may be used.

Additionally, provided a float arm is molded from an appropriate material, it may be re-molded using heating. Thus, if one or more float arms are provided with watercraft hull-contacting surfaces that are aligned with the chines of the watercraft, it may be possible to heat those surfaces and press them against the chines to create an indention or indentions that correspond to the chines.

B. Embodiments Suited for Use with Watercraft-Lifting Systems

The present apparatuses are useful for centering a watercraft that is being docked. This means that when the present apparatuses are used they will, during the docking process, tend to center a watercraft that is initially off-center, but this doe not mean that use of the present apparatuses will necessarily result in a perfectly centered watercraft. The watercraft—such as a boat or a personal watercraft (e.g., a jet ski)—can have a longitudinal watercraft axis. The longitudinal watercraft axis of a given watercraft is an axis that runs from the front of the craft (i.e., the bow) to the rear of the craft (i.e., the stem). FIGS. 8-13 show an embodiment of the present apparatuses that is configured for use with a watercraft-lifting system (in this example, a lift tank system).

Figure 8:
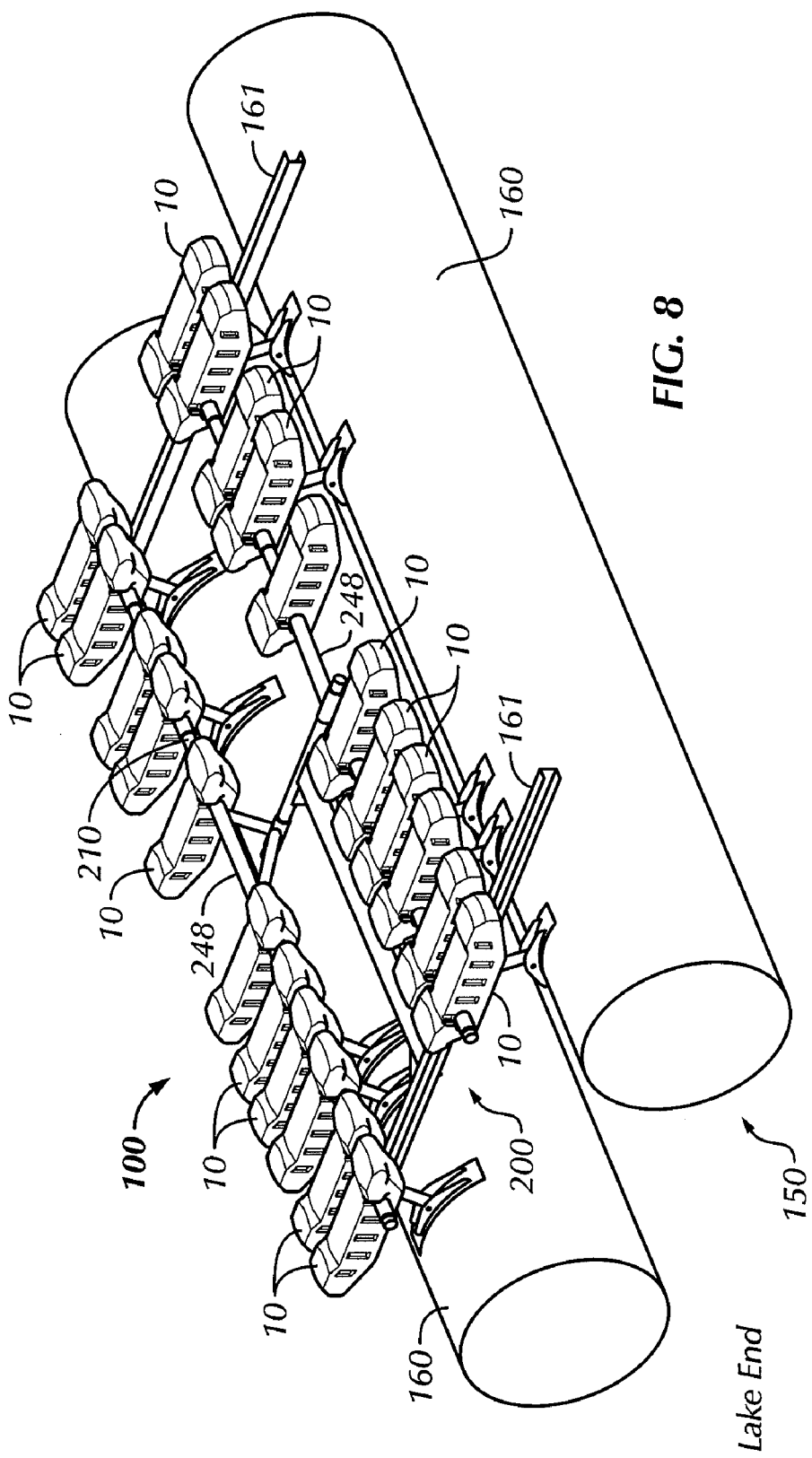
FIG. 8 is a perspective view of one of the present apparatuses in use with a lift tank system.

FIG. 8 is a perspective view of apparatus 100 in use with lift tank system 150. Lift tank system 150 includes two tanks 160, which may be traditional lifting tanks. The two tanks may be held together in any traditional fashion, and may be made from any suitable material. FIGS. 8-13 show that pieces of C-channel iron 161 can be used to hold the two tanks together near the front and rear of lift tank system 150 (the flat plates that can be attached to metal tanks (e.g., by welding) and to which the C-channel iron 161 can be welded are not shown). Tanks 160 may, of course, be secured to each other using any suitable means. The lifting mechanism that can be used to control the height of tanks 160 in water is not shown, in order to focus attention on the present apparatuses. For lift tanks that are 13 feet long and 30 inches in diameter, 4-inch C-channel iron may be used for C-channel iron 161. The tanks may be spaced apart from each other by 60 inches, from center to center. Tanks of many other sizes may be used consistently with the present apparatuses. For example, tanks ranging in diameter from 24 inches to 36 inches may be used.

Apparatus 100, in a broad respect, includes a pair of float arms 10 that are configured to help center a watercraft having a longitudinal watercraft axis. A pair of float arms that is configured to "help center" a watercraft will, when used, tend to center a watercraft during the docking process that is initially off-center, but may not necessarily result in a perfectly centered watercraft. Passageway 40 (not labeled for clarity) of each float arm 10 in the pair is substantially parallel to the longitudinal watercraft axis, meaning that the axis that runs through passageway 40 (see FIG. 1) will be substantially parallel to the longitudinal axis of a watercraft that is docked over the float arms. The passageways of the float arms also serve as the means by which each float arm in the pair is configured to be pivotally coupled a watercraft docking structure (e.g., pivotally coupled to lift tank system 150 through frame 200, discussed in greater detail below). Each of the float arms in the pair is, by virtue of passageway 40 in this embodiment, configured to pivot about an axis, the two axes being substantially parallel to each other and laterally spaced apart from each other.

Apparatus 100 may be configured to be coupled to (and, in this embodiment, is coupled to) frame 200, which is configured to be pivotally coupled to (and, in this embodiment, is coupled to) lift tank system 150. Frame 200 includes two substantially parallel longitudinal bars 210 that run through passageways 40 of float arms 10. In the exemplary embodiment shown in FIGS. 8-13, bars 210 may be made from schedule 40 pipe, may have an outer diameter of 2 inches (nominal), an inner diameter of 1½ inches, and be 13 feet long. Those of ordinary skill in the art will understand, however, that bars 210—as well as all of the components shown in FIGS. 8-13—may be made from any suitable material.

Figure 9:
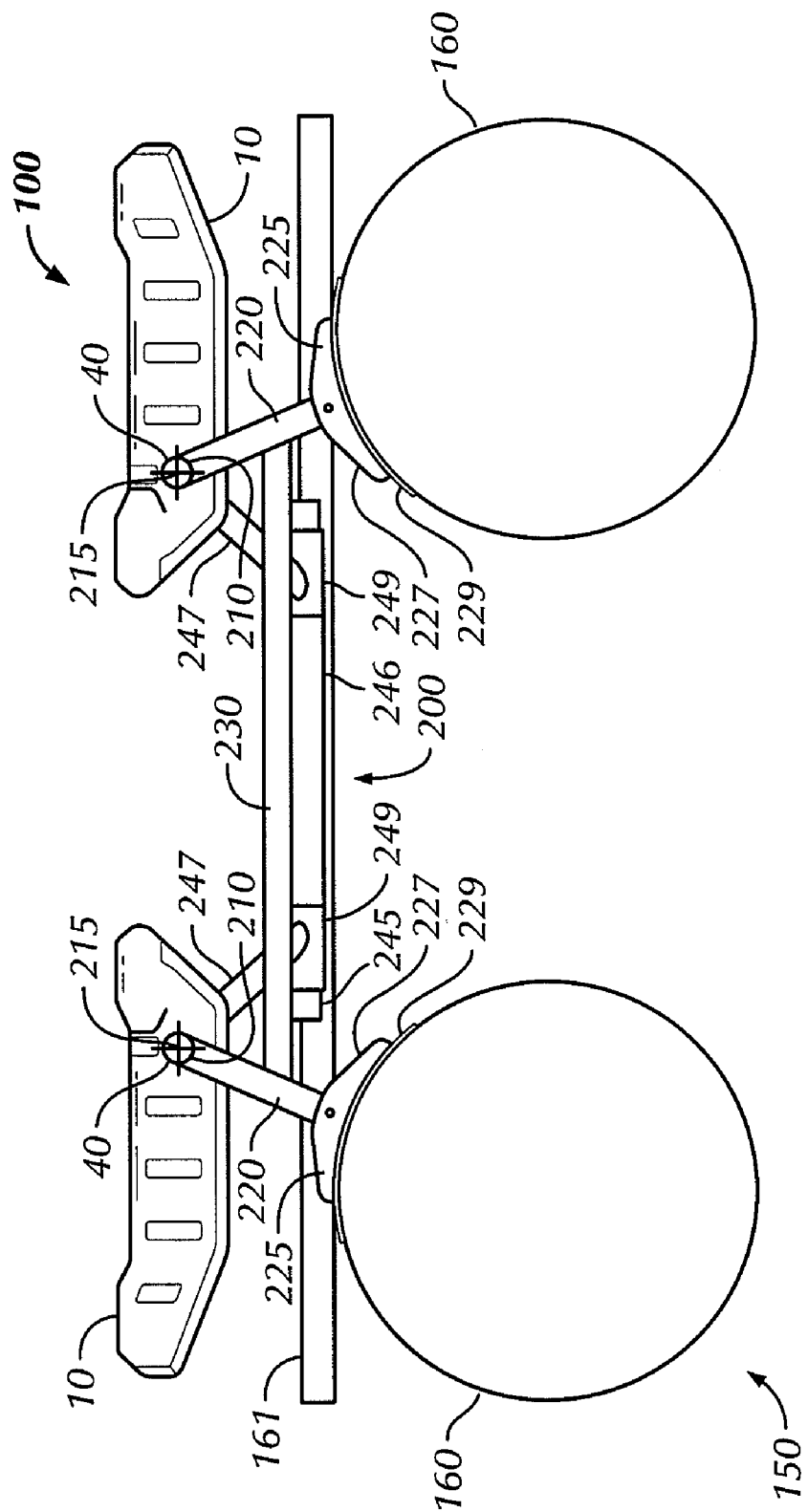
FIG. 9 is a an end view of the apparatus shown in FIG. 8.

The "Lake End" of frame 200 is labeled in FIG. 8. This is the end of the frame that will face the lake (or other body of water), and it is the end of the frame that a watercraft will approach first. The end view shown in FIG. 9 is taken from inside the C-channel iron 161 farthest from the Lake End, looking toward the Lake End of frame 200.

Figure 10:
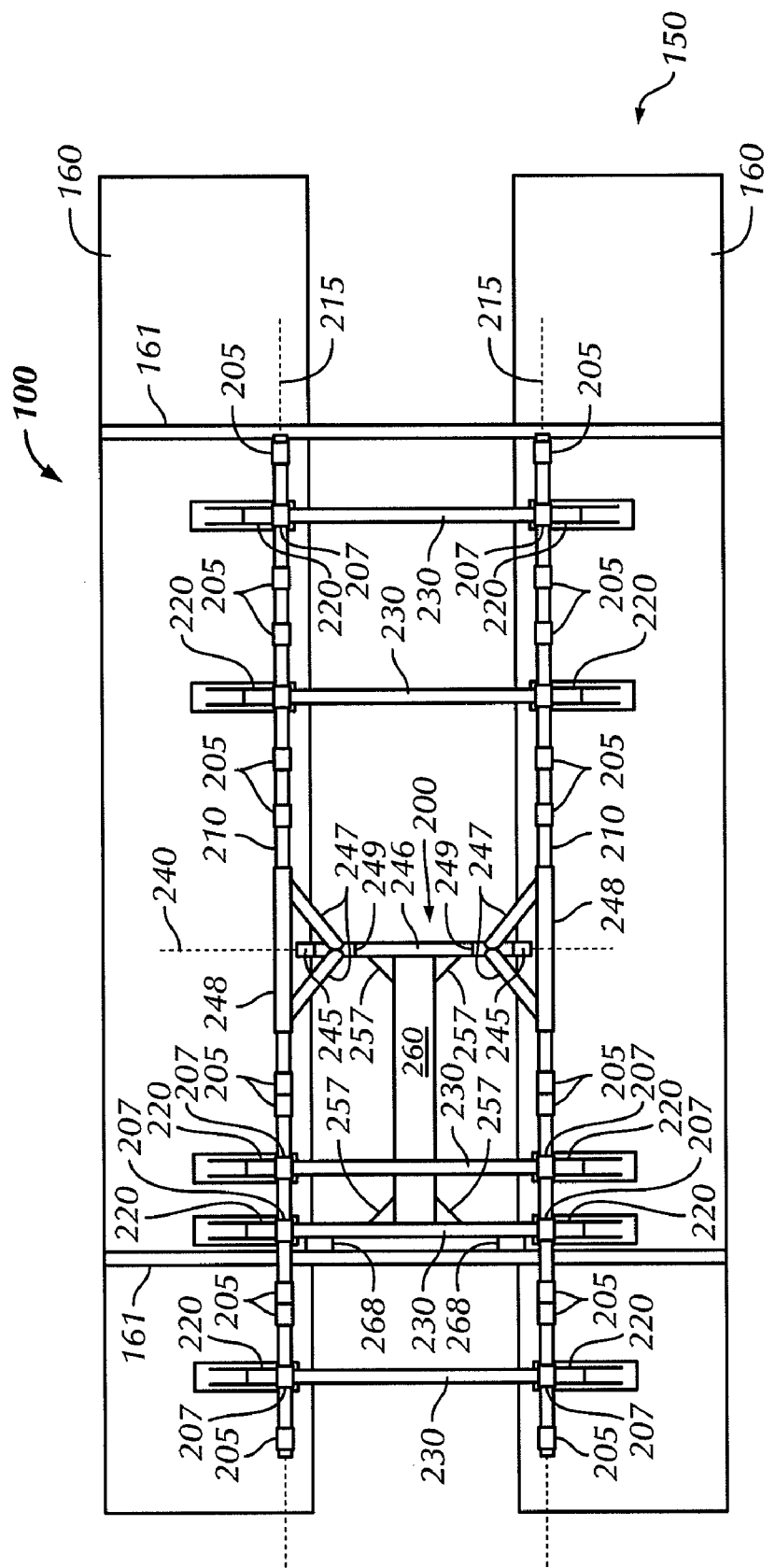
FIG. 10 is a top view of the frame of the apparatus shown in FIG. 8.

A top view of frame 200 is shown in FIG. 10. This view shows that frame 200 may include a number of spacers 205 that function to keep apart the float arms that are used. Although the spacers are shown as being cylindrical in shape, they may also be square. For example, 11-gauge 2-inch inner diameter galvanized steel box tubing may be used for spacers 205. Spacers 205 may be coupled to longitudinal bars 210 in any suitable fashion, including the use of 3/8-inch bolts (e.g., ROLOC bolts). Holes for the bolts (not shown) may be drilled after float arms 10 and spacers 205 are in place, although the holes alternatively could be drilled first. Spacers 205 may be made from any suitable material other than steel, provided the material is sufficiently sturdy.

In addition to keeping apart the float arms that are used, the spacers may also play a role in restricting the rotation of a given float arm. Rotation restriction may be achieved by providing float arms 10 with one or more rotation-restricting openings 41. A "rotation-restricting opening" of a float arm is defined as an opening that is configured to prevent—when used in conjunction with a supplemental device (e.g., a spacer 205) that is connected (e.g., potentially integrally) in some way to the bar or other structure running through the passageway bordered by the opening—a complete revolution of the float arm around the bar or other structure about which the float arm pivots. There are many ways to achieve rotation-restriction openings, and many ways to control the degree of rotation they permit.

Figure 7A:
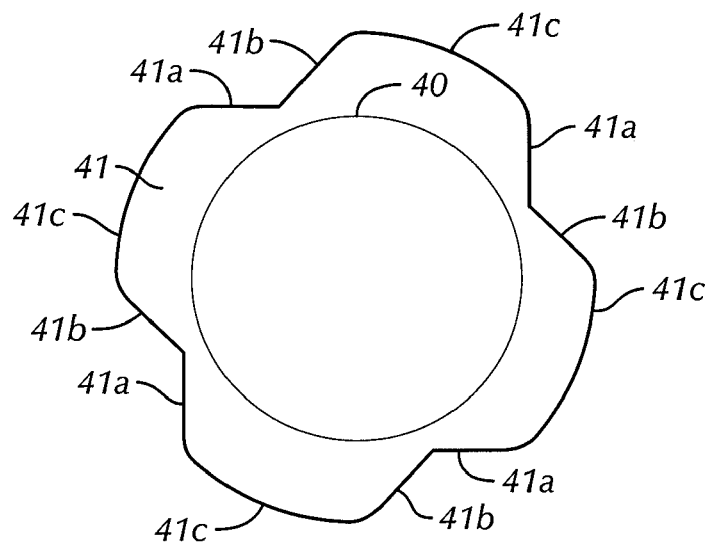
FIG. 7A depicts one example of a rotation-restricting opening that may be provided in one of the present float arms.
Figure 7B:
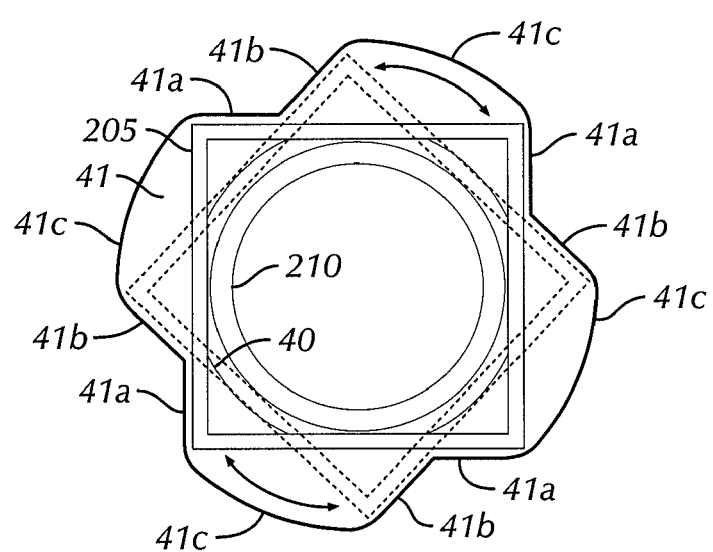
FIG. 7B depicts how a spacer may rotate within the rotation-restricting opening shown in FIG. 7A.

An exemplary rotation-restricting opening 41 is shown in FIG. 7A. The degree of rotation permitted by this opening is 45 degrees; degrees of rotation ranging from 5 to 45 degrees, from 10 to 45 degrees, from 15 to 45 degrees, from 20 to 45 degrees, from 25 to 45 degrees, from 30 to 45 degrees, from 35 to 45 degrees, and from 40 to 45 degrees may also be used. In particular, 30 degrees of rotation is one example of a suitable range of rotation for the present rotation-restricting openings. When rotation-restricting openings 41 are used, they may be ¾ inches in depth. As FIG. 7A shows, rotation-restricting opening 41 may have two sets of rotation-restricting sides joined by arcs. Specifically, the embodiment of rotation-restricting opening 41 shown in FIG. 7A includes a first set of 4 rotation-restricting sides 41A and a second set of rotation-restricting sides 41B. Arcs 41C connect the rotation-restricting sides. Each rotation-restricting side 41A and 41B include a substantially straight segment against which a portion of a spacer 205 made from square tubing may rest. FIG. 7B shows how spacer 205 may rotate between the two positions defined by the two sets of rotation-restricting sides.

By using one or more rotation-restricting openings with one or more of the present float arms, the float arms should be prevented from pivoting too far, such that they get flipped over (for example) and can no longer function in the water. For example, if a watercraft (e.g., a boat) is off-center (meaning it is not centered between the pairs of opposing float arms) during the initial stage of docking, and contacts one or more floats to the outside of the longitudinal axis about which they pivot, the natural tendency of freely-rotating float arms will be to depress into the water and potentially flip over, sending the boat off to the side, and forcing the operator to start the docking process over. By using one or more of the present rotation-restricting openings, however, the potential for this should be minimized. When such openings are used, the float arms that are contacted will be restricted in their rotation from depressing into the water and flipping over, the frame to which they are coupled will submerge as a result of the weight of the boat, and the buoyant force of the water will cause the outside end or ends of the contact float arms to "close," thus pushing the boat back towards the center.

The rotation-restricting openings also may prevent float arms from pivoting too much when being transported, such as float arms that are used with a trailer (as described below). FIGS. 7A and 7B are to scale in terms of the proportions of rotation-restricting opening 41 and passageway 40.

Figure 17:
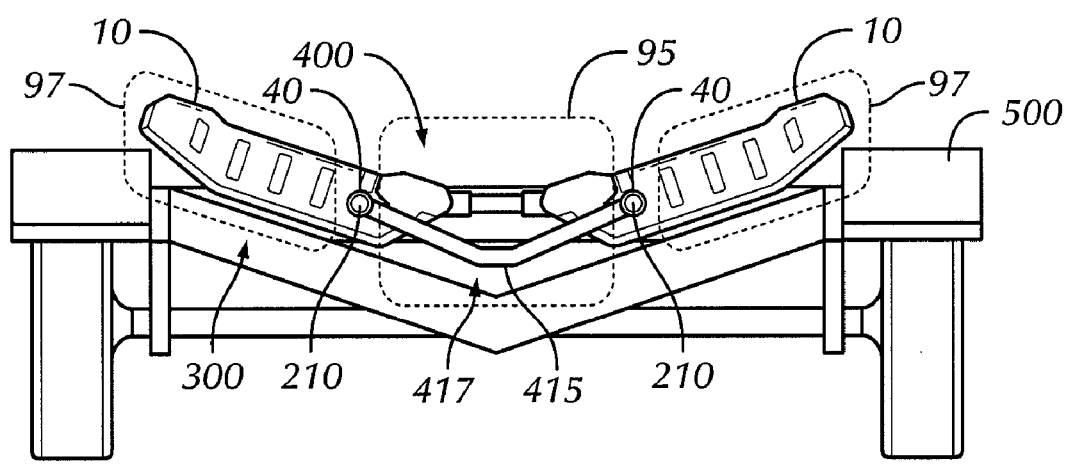
FIG. 17 is an end view of the apparatus shown in FIG. 15.

After the float arms or arms are positioned on a given frame, their "open" position may be fixed by using an embodiment of the present rotation-restricting openings in combination with an embodiment of the present openings. For example, the "open" position shown in FIG. 17 (which is not completely open in that the inside end and outside end top surfaces (not labeled) are not perfectly parallel with the ground; the "open" position shown in this figure is actually "closed" by a few degrees) by fixing the position of the spacers that are used such that the float arms cannot be forced any more open. By configuring the float arms that are used with an "open" position that is tilted slightly inwardly, as shown in FIG. 17, it may be easier for a boat operator to dock his or her boat than if the float arms are in an "open" position that is perfectly flat.

Spacers 205, and all structures that can be connected to longitudinal bars 210 and that contact the float arms in use, may be coated with a protective coating designed not to scratch or damage the material from which the float arms are made. A baked-on power coating, such as one made from polyester, may be used for this purpose.

While spacers that have no breaks in their perimeter are shown in the figures, those of ordinary skill in the art will understand that clamps (which are not complete rings or box tubes) also may be used for spacers 205, provided a sufficient clamping force can be achieved initially and maintained during docking of a watercraft.

As shown in FIG. 9, frame 200 also may include a number of tank connection bars 220 that are connected (e.g., by welding) to a sleeve (e.g., metal sleeve) 207 (see FIG. 10; not visible in FIG. 9) through which a given longitudinal bar 210 runs. Tank connection bars 220 extend from longitudinal bars 210 toward tanks 160 beneath them. Tank connection bars 220 may be made from any suitable material, including 11-gauge 2-inch galvanized steel box tubing; sleeves 207 may be made from any suitable material, including T-connectors that are made of 11-gauge 2-inch galvanized steel box tubing. Sleeves 207 may be bolted to longitudinal bars 210 using the same type of bolts that may be used to couple spacers 205 to longitudinal bars 210.

Frame 200 also may include tank footings 225, each of which is connected to the lowermost end of a tank connection bar 220 in a manner that prevents rotation of the pad. Each tank footing 225 includes two finger 227 connected to a pad 229. The fingers may be connected to the pad by welding, and the material used for both may be, for example, galvanized steel. A bolt may be used to pin a tank footing 225 to tank connection bar 220. The bolt may be tightened, such that tank footing 225 becomes fix, after pad 229 is properly oriented with respect to the curve of tank 160. The curved surface of pad 229 may be configured to conform to the shape of the tank 160 on which it rests when lift tank system 150 is in a raised position.

Frame 200 also may include lateral bars 230, each of which can be connected to two opposing tank connection bars 220 in any suitable manner, such as welding. Lateral bars 230 may be made from 11-gauge 2-inch galvanized steel box tubing. Lateral bars 230 may be approximately 44 inches long. Although not shown, a skeg tray may be attached to one or more lateral bars 230 to collect any skegs on the watercraft hull. The skeg tray may have any suitable dimension, including being approximately 4 inches wide and 6 inches tall, and may be made from any suitable material, such as 11-gauge steel.

Figure 12:
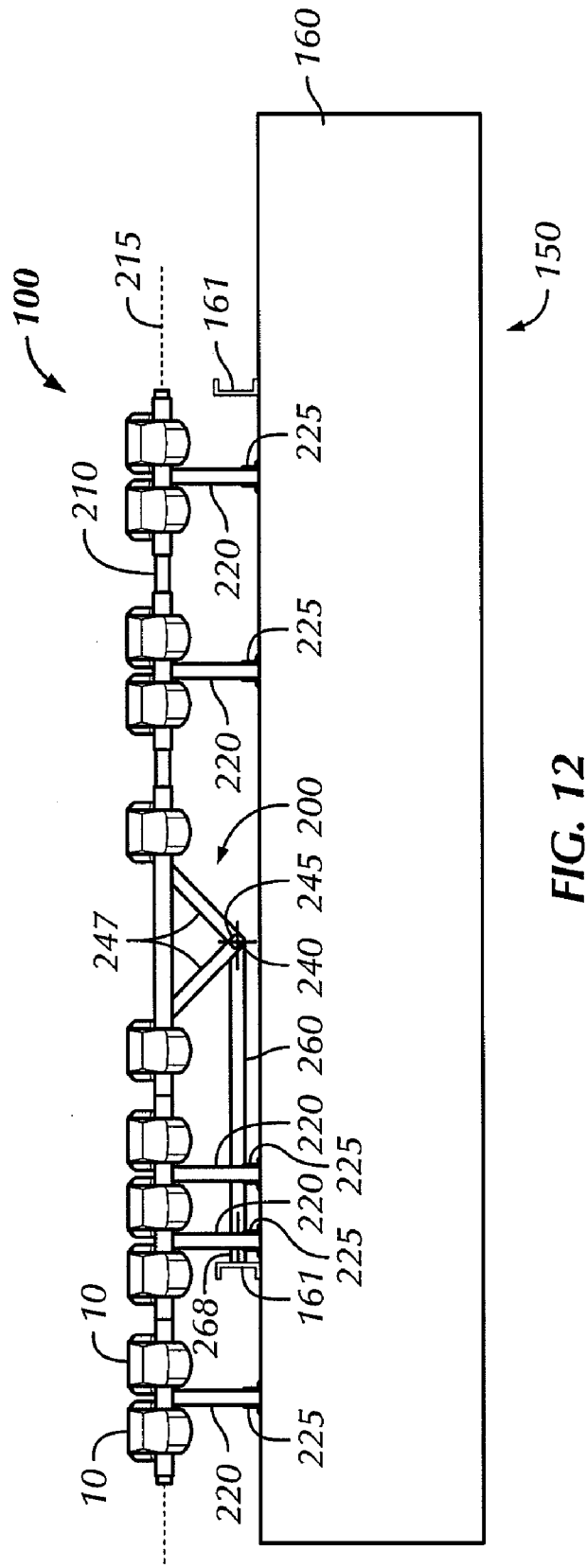
FIG. 12 is a side view of the apparatus shown in FIG. 8, where the lift tanks are in a raised position.

Frame 200 pivots about frame axis 240, shown from the side in FIG. 12 and from above in FIG. 10. Frame axis 240 runs through first bar 245 (which may be part of frame 200, as shown in this embodiment), and is substantially perpendicular to both (a) the longitudinal watercraft axis of the watercraft that can be docked on it and (b) axes 215. Longitudinal bars 210 are each connected to first bar 245 through angled bars 247 and sleeves (e.g., metal sleeves) 248 through which longitudinal bars 215 run and sleeves (e.g., metal sleeves) 249 through which first bar 245 runs. First bar 245 may be made from schedule 40 pipe having a 2-inch (nominal) outer diameter. Sleeves 248 may be made from 11-gauge 2-inch galvanized steel box tubing. Sleeve 249 may be made from 11-gauge 2-inch (nominal) inner diameter galvanized steel box tubing. Angled bars 247 may be welded to sleeves 248 and 249, all of which may be part of frame 200, as shown in the depicted embodiment. The sleeves and spacers in FIGS. 12 and 13 have not been labeled so as not to clutter those drawings.

Figure 13:
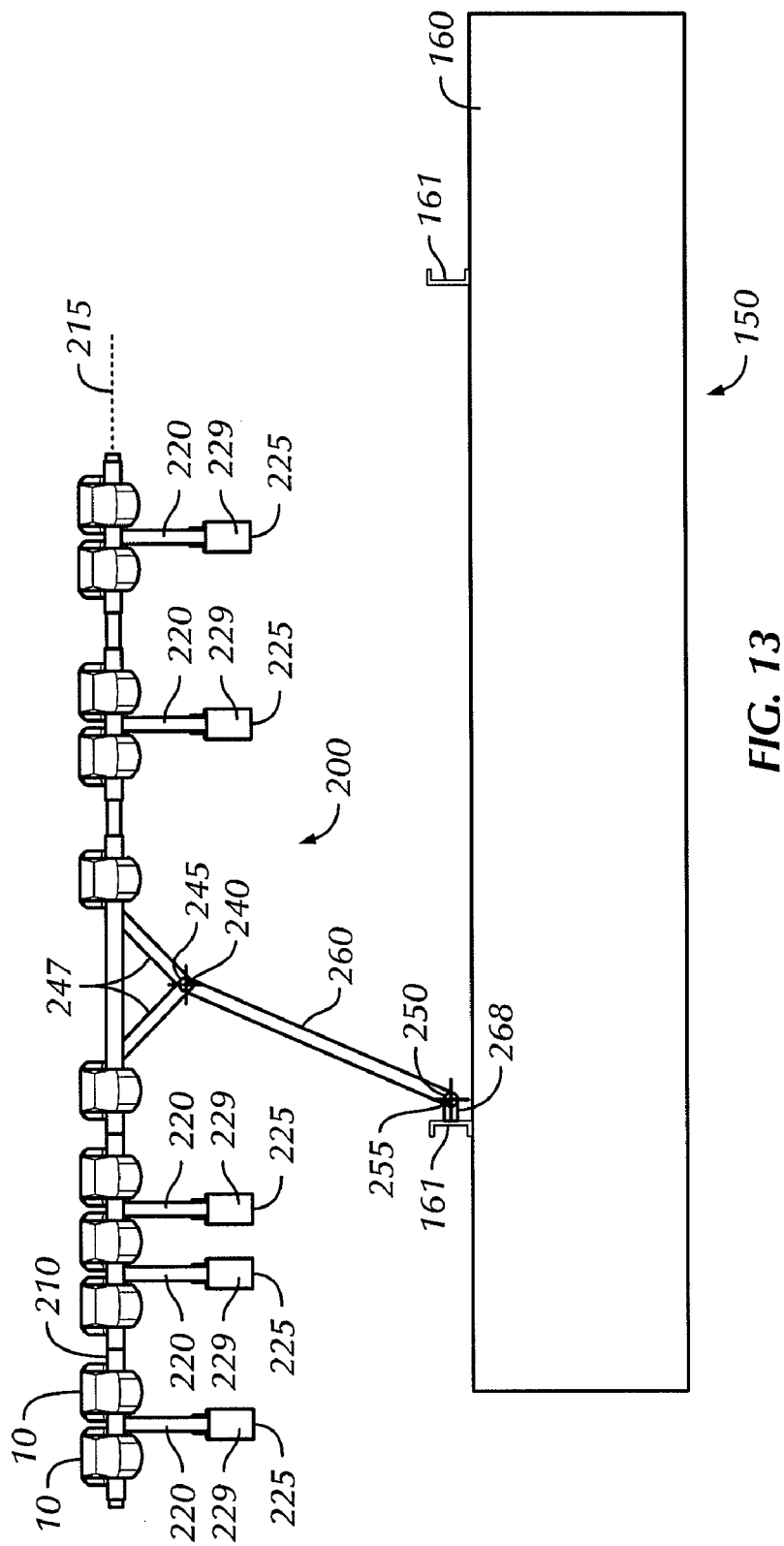
FIG. 13 is a side view of the apparatus shown in FIG. 8, where the lift tanks are in a lowered position.

As best shown in FIG. 13, first bar 245 is connected to second bar 250, which may also be part of frame 200 as shown in this embodiment, and which has a stationary axis 255 running through it that is substantially parallel to frame axis 240. Even more specifically, frame 200 also may include lift bar 260, which is connected to both first bar 245 and second bar 250 using angled braces 257. By way of example, to achieve the connection between first bar 245 and lift bar 260, two angled braces 257 may each be welded to a sleeve (e.g., metal sleeve) 246 that surrounds first bar 245 (thus achieving an indirect connection to first bar 245) and to lift bar 260. Lift bar 260 may be a 2-inch by 6-inch box tube that is made from 11-gauge steel and is 36 inches long. Sleeve 246 may be made from schedule 40 2-inch (nominal) inner diameter pipe. Angled braces 257 each may be made from 11-gauge 1½-inch box tubing.

Figure 14A:
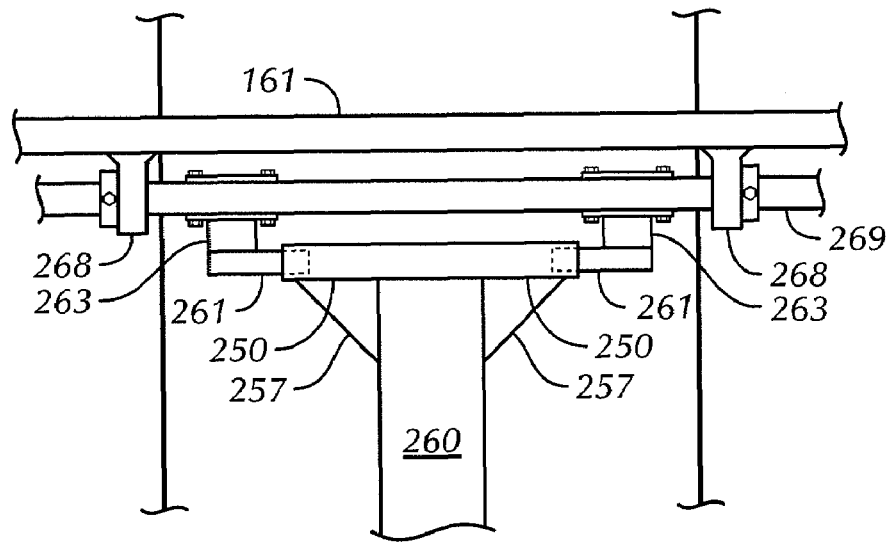
FIG. 14A is a top view showing a portion of the frame shown in FIG. 10.

The manner in which second bar 250 may be connected to lift bar 260 is shown only generally in FIGS. 10-13. A more detailed representation of one manner of connecting second bar 250 to lift bar 260 appears in FIG. 14A. Second bar 250 may be made from schedule 40 2-inch (nominal) inner diameter pipe. As FIG. 14A shows, two short sections of pipe 261 may be threaded through the open ends of second bar 250 by approximately 1 to 3 inches. Short sections of pipe 261 may be schedule 40 2-inch (nominal) outer diameter pipe. Short sections of pipe 261 may be connected to (e.g., by welding) short sections of box tubing 263, which may be made from 11-gauge 2-inch galvanized steel box tubing. Box tubing sections 263 may be connected using plates and U-bolts (not numbered) to lift bar 269, which may be part of the pneumatic lifting system (not shown) that operates to raise and lower lift tanks 161. Lift bar 269 may be made from 11-gauge box tubing and may, in turn, be pivotally coupled to C-channel iron 161 using cylindrical collars 268. Although not shown, sleeves may be placed over C-channel iron 161 at the point of connection of lift bar 269. Both C-channel iron 161 and lift bar 269 are well known structures to those of ordinary skill in the art.

Figure 14B:
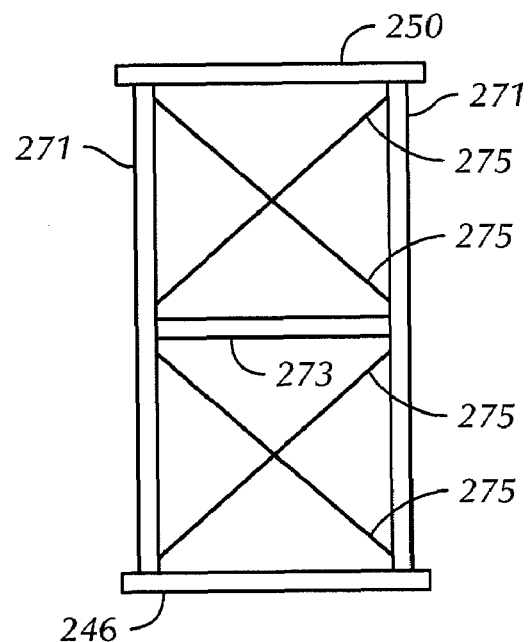
FIG. 14B shows a truss structure that may be used as an alternative to a portion of the structure depicted in FIG. 10.

FIG. 14B shows a truss structure that may be used as an alternative to lift bar 260 and angled braces 257. The truss structure includes longitudinally-oriented bars 271 be connected in any suitable fashion (e.g., welded) to sleeve 246 and second bar 250. Crossbar 273 may connected (e.g., welded) at a right angle to both longitudinally-oriented bars 271. Bars 275 may then be connected in diagonal fashion to both longitudinally-oriented bars 271, as shown. Each of the bars shown in FIG. 14B may be made from any suitable material, including 11-gauge 2-inch galvanized steel box tubing.

Figure 11:
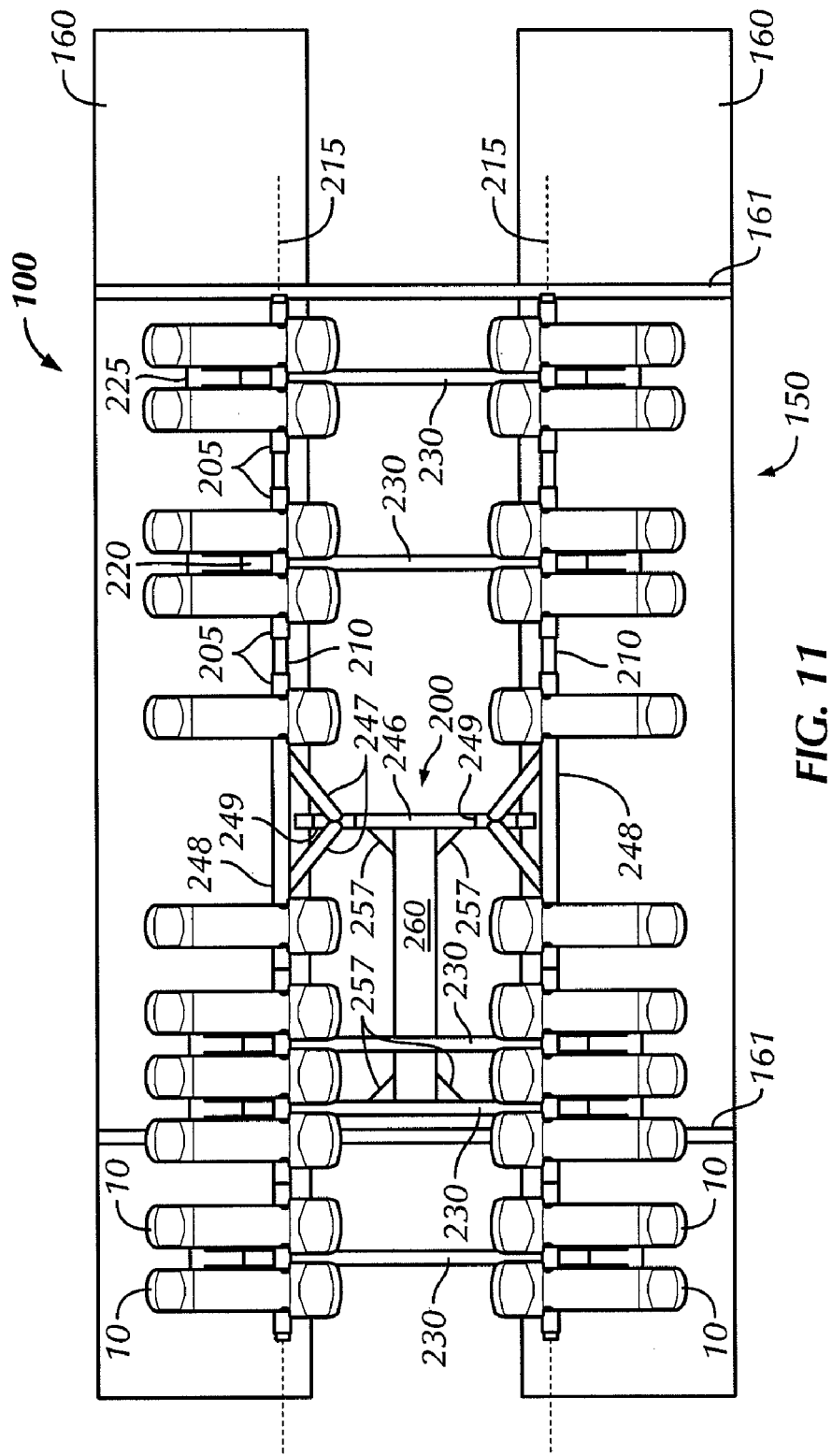
FIG. 11 is a top view of the apparatus shown in FIG. 8.

Returning to apparatus 100, it includes at least two float arms 10, each of which is pivotally coupled to frame 200. More specifically, each float arm 10 is pivotally coupled to a longitudinal bar 210. "Pivotally coupled" in this context means that the float arms can pivot to some degree about longitudinal bar 210. The float arms need not be able to rotate completely around a given longitudinal bar, but they should be able to pivot freely within some predetermined range (such as the range defined by the rotation-restricting sides shown in FIGS. 7A-7B), and that predetermined range must be something other than simply incidental slippage or rotation due to tolerances between parts. As FIG. 8 and 10 show, multiple pairs (e.g., 2, 3, 4, 5, 6, 7, 8, 9, 10, 11, 12, 13, 14, 15, or more) of float arms 10 may be pivotally coupled to frame 200, each float arm 10 in a pair being pivotally coupled to one of the longitudinal bars 210. For accommodating a watercraft, such as a boat, that is 18 to 28 feet long (e.g., 26 feet long), 7 and ½ to 8 and ½ feet wide (e.g., 8 and ½ feet wide) at the beam, and 1,200 to 7,000 pounds (e.g., about 6000 pounds), a pair of the float arms 10 shown in FIGS. 1-6 may be used for approximately every 2 feet of boat length. FIG. 11 is a top view of apparatus 100 in use with frame 200. As with FIGS. 12 and 13, certain features have not been labeled in FIG. 11 in order to keep the drawing clear.

An axis 215 runs through each longitudinal bar 210 (and consequently through each float arm passageway 40). Axes 215 are laterally spaced apart from each other. A suitable lateral distance between the two is 30 inches for a frame that is designed to accommodate the boats described above. The lateral distance may be altered—as those of ordinary skill in the art will recognize from reading this description—depending on the size of the watercraft that will be docked over the frame. Axes 215 also may be substantially parallel to the longitudinal watercraft axis, meaning that when a watercraft is docked in place above lift tank system 150, the longitudinal axis of the watercraft will be substantially parallel to each axis 215.

Each float arm 10 of apparatus 100 is configured to pivot about an axis 215 by virtue of the passageway provided in the float arm through which longitudinal bar 210 runs. Although longitudinal bars 210 each can be constructed out of one continuous piece of material, either or both of longitudinal bars 210 can be constructed out of multiple pieces of material, such as the material described above, that are coupled together (e.g., different bars connected together).

Lift tank system 150 is shown in its raised, or floating, position in FIGS. 8-12, and in its lowered, or submerged, position in FIG. 13. To dock a watercraft over lift tank system 150, lift tanks 160 are submerged using a traditional mechanism, such as pneumatics. As lift tanks 160 are submerged, float arms 10 of apparatus 100 will float, keeping frame 200 from submerging with lift tanks 160. Moreover, the longitudinal bars of frame 200 may be a few inches out of calm water. As a watercraft approaches apparatus 100, and the bow portion of the watercraft hull contacts either or both of the float arms 10 in the first pair of float arms, the float arm or arms that are contacted will tend to center the watercraft over frame 200 and lift tank system 150. As this is going on, the pressure of the watercraft on the contacted arm or arms will tend to submerge those arms. However, because the frame is able to pivot about frame axis 240, the entire frame should not submerge with that arm or those arms. Instead, the back end of frame 200 will tilt upward in response to the front end of frame 200 being submerged, the upward tilting being a result of the buoyant force of the water on the front end float arms.

Were the frame to submerge, the buoyant force of the water would force the outside ends of the float arms to "close," or swing upwardly out of the water and toward the center of the frame. Such a closed configuration would narrow the "target" for the watercraft operator, the target being the space into which the operator can maneuver the watercraft. Because the frame is able to pivot, and the float arms near the front end of the frame are able to remain afloat and out of the water, those float arms remain "open" (the outside end top surface 18 facing up), and the operator's target is as large as it can be. This may make docking the craft easier.

Furthermore, as the watercraft advances over apparatus 100, including frame 200, float arms 10 will have a breaking (i.e., stopping) effect on the watercraft, causing it slow down due to contact with inside end top surface 16 and outside end top surface 18 of the various float arms. This breaking effect will be particularly advantageous in crosswinds and/or rough waters because it will allow the operator of the watercraft to approach apparatus 100 with more speed than has traditionally been possible. The operator will therefore have more control over the watercraft during the docking process. As most operators know, watercraft operated at lower speeds are more difficult to steer and control in crosswinds and/or rough waters.

Once the boat is docked over apparatus 100, lift tanks 160 may be raised, and the watercraft and apparatus 100 may be lifted out of the water for short- or long-term storage of the watercraft. The combination of tank connection bars 220 having tank footings 225 and lateral bars 230, which are welded to and connect opposing tank connection bars 220, will provide sufficient support for frame 200 as the watercraft rests on frame 200.

C. Embodiments Suited for Use with Watercraft Trailers

The present apparatuses also can be configured for use with trailers. Specifically, some embodiments of the present apparatuses are configured to be coupled to frames that are configured to be coupled to trailers; some embodiments include such frames; and some embodiments include both the frame and the trailer. Some of the present frames—such as the one shown in FIGS. 15 and 16—may be constructed in a manner that makes them connectable to existing trailers (certain modifications may be made to a given trailer to achieve the connection). In this sense, such a frame may be characterized as retrofittable to a given trailer. In other situations, a trailer may be built initially with one of the present frames coupled to it.

Figure 15:
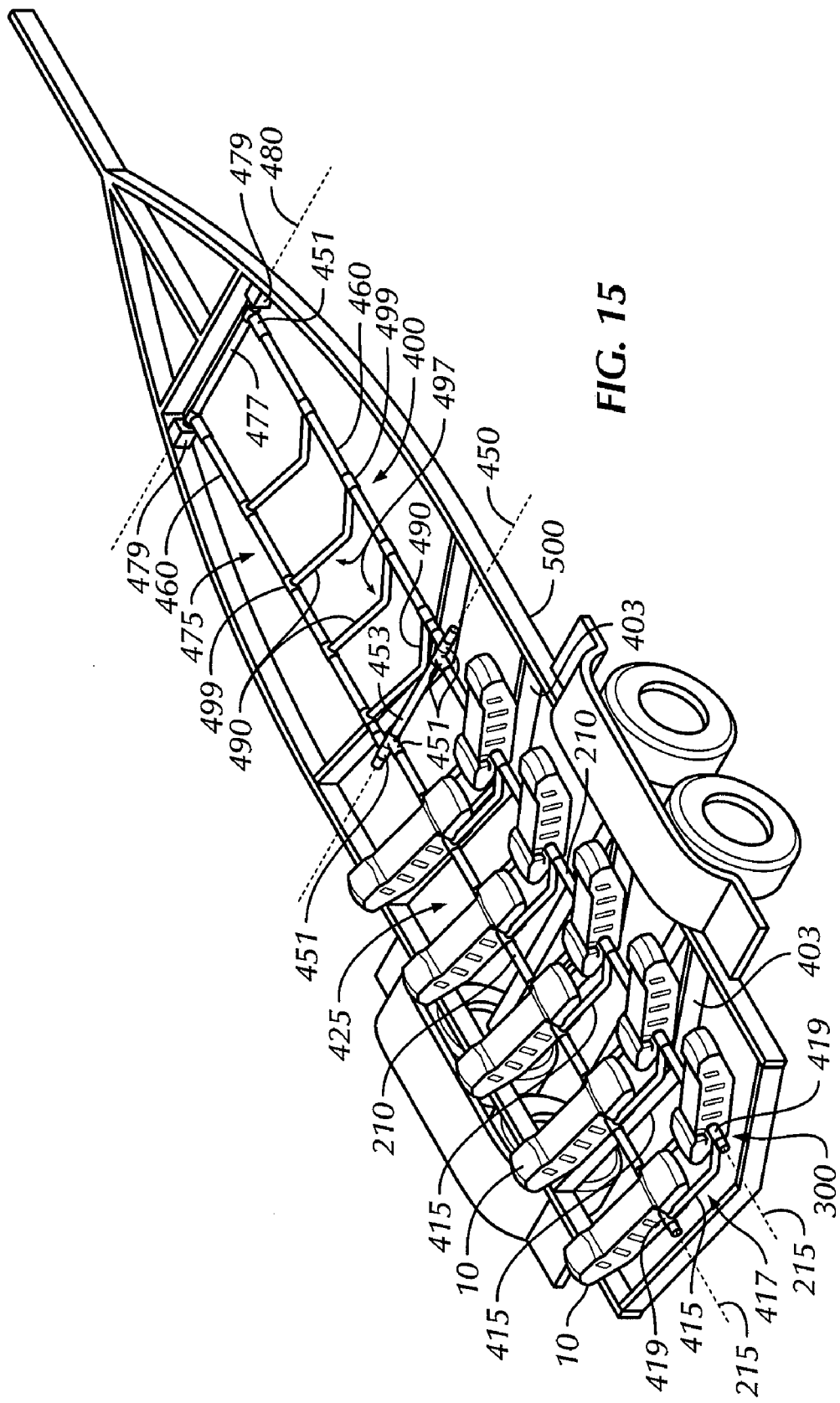
FIG. 15 is a perspective view of one of the present apparatuses in use with a trailer.

FIG. 15 shows an example of one of the present apparatuses that is configured to be coupled to (and, in fact, is coupled to) a frame that is configured to be coupled to (and, in fact, is coupled to) a watercraft trailer (e.g., a boat trailer). A watercraft having a longitudinal watercraft axis may be docked (e.g., loaded) on apparatus 300.

Apparatus 300 includes a frame 400 that is coupled to trailer 500. In other embodiments, the present apparatuses are not simply just pivotally coupled to a trailer, they include the trailer.

At least one pair of float arms 10 are pivotally coupled to frame 400. In this embodiment, 5 pairs of float arms 10 (for a total of 10 float arms) are shown as being pivotally coupled to frame 400, although more or fewer pairs may be used to best accommodate a given watercraft. Frame 400 includes a back portion—designated generally by 425—to which float arms 10 are pivotally coupled, and a front portion—designated generally by 475—that is pivotally connected to back portion 425 along lateral axis 450. Lateral axis 450 runs through four T-connectors 451, two of which are coupled to substantially parallel front bars 460 (which are part of this embodiment of front portion 475), and two of which are coupled to substantially parallel longitudinal bars 210 (which are part of this embodiment of back portion 425). A lateral joining bar 453 runs through all four T-connectors 451, and is the bar around which the T-connectors pivot.

Figure 20:
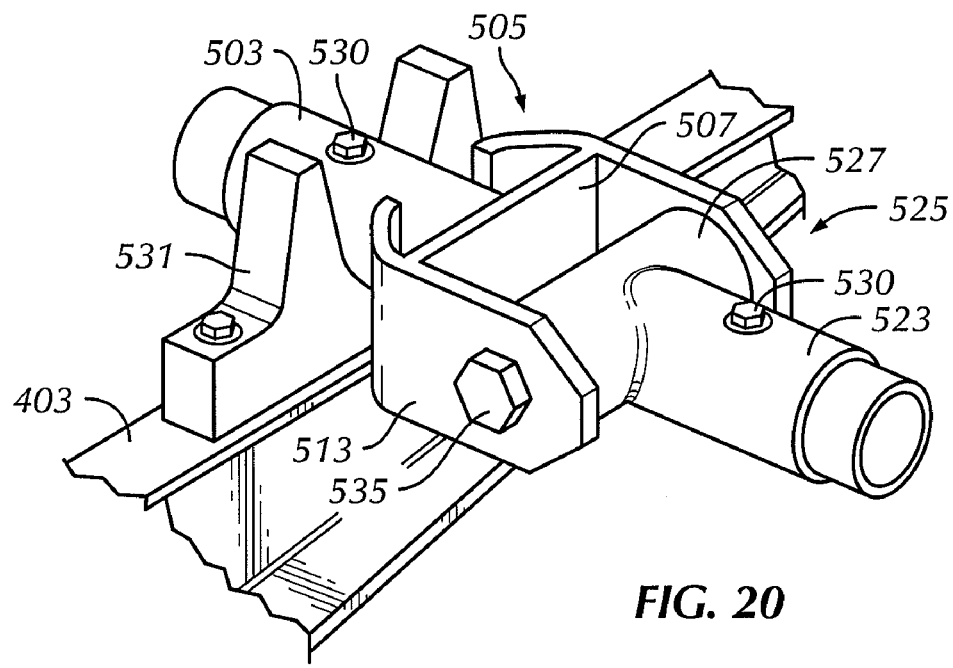
FIG. 20 is a partial perspective view, showing one manner of hinging the back portion of the apparatus shown in FIG. 15 to the front portion of that apparatus.

Instead of using four T-connectors to couple back portion 425 to front portion 475, the arrangement shown in FIG. 20 may be used. T-connector 505 may have an open portion 503 into which an end of a longitudinal bar 210 may be inserted, and a closed portion 507 oriented substantially perpendicularly to portion 503. Bracket 513 may be connected to (e.g., forged or welded) and effectively part of T-connector 505. T-connector 525 may have a longitudinal open portion 523 into which an end of a front bar 460 may be inserted. T-connector 525 also may have a lateral open portion 527 through which a bolt may be threaded around which T-connector 525 can pivot. Bolts 530 can be used to connect the T-connectors to the bars positioned in their respective open portions. A bolt 535 also may be threaded through openings provided in bracket 513 and lateral portion 527 of T-connector 525, to keep T-connector 525 in place. FIG. 20 also shows that cradles 531 that are bolted (e.g., using ⅜-inch ROLOC bolts) to lateral structural members 403 of frame 400 may be used to support longitudinal support bars 210. Such cradles may be used near the front end of trailer 500 as well, in order to support front bars 460. Such cradles may be made from any suitable material, such as steel or polyethylene, and may be 6 inches wide at its widest point, 3 inches high, and 1½ inches thick.

Front portion 475 also is configured to be (and in this embodiment actually is) pivotally coupled to trailer 500 along lateral trailer connection axis 480. That coupling occurs by virtue of front lateral bar 477, the ends of which are positioned in the openings in box wells 479, which may be connected (e.g., by welding) to trailer 500 as shown in FIG. 15. An end of front bar 460 may be placed in the open longitudinal portion of a T-connector 451, and front lateral bar 477 may be threaded through the open lateral portion of that T-connector 451. A bolt may be placed through the lateral portions of those T-connectors 451 in order to fix them to front lateral bar 477, which can then pivot within box wells 479. Alternatively, front lateral bar 477 can be fixed such that it does not pivot within box wells 279 and the T-connectors may be not bolted to front lateral bar 477, such that they can pivot about front lateral bar 477. Front lateral bar 477 may be connected to trailer 500 in a manner that allows it, or the remainder of frame 400 connected to it, to pivot. For example, openings can be cut into the outermost trailer frame segments (those to which box wells 479 are connected on their inside), front lateral bar 477 can be made long enough to extend through those openings, and a pin can be placed through the portions of front lateral bar 477 that extend outside of the outermost trailer frame segments, thus preventing front lateral bar 477 from moving back through the trailer frame openings.

Lateral trailer connection axis 480 is substantially parallel to lateral axis 450. Frame 400 may be characterized as being configured to be pivotally coupled to trailer 500 along lateral trailer connection axis 480 (which may also be characterized as a frame axis).

Figure 16:
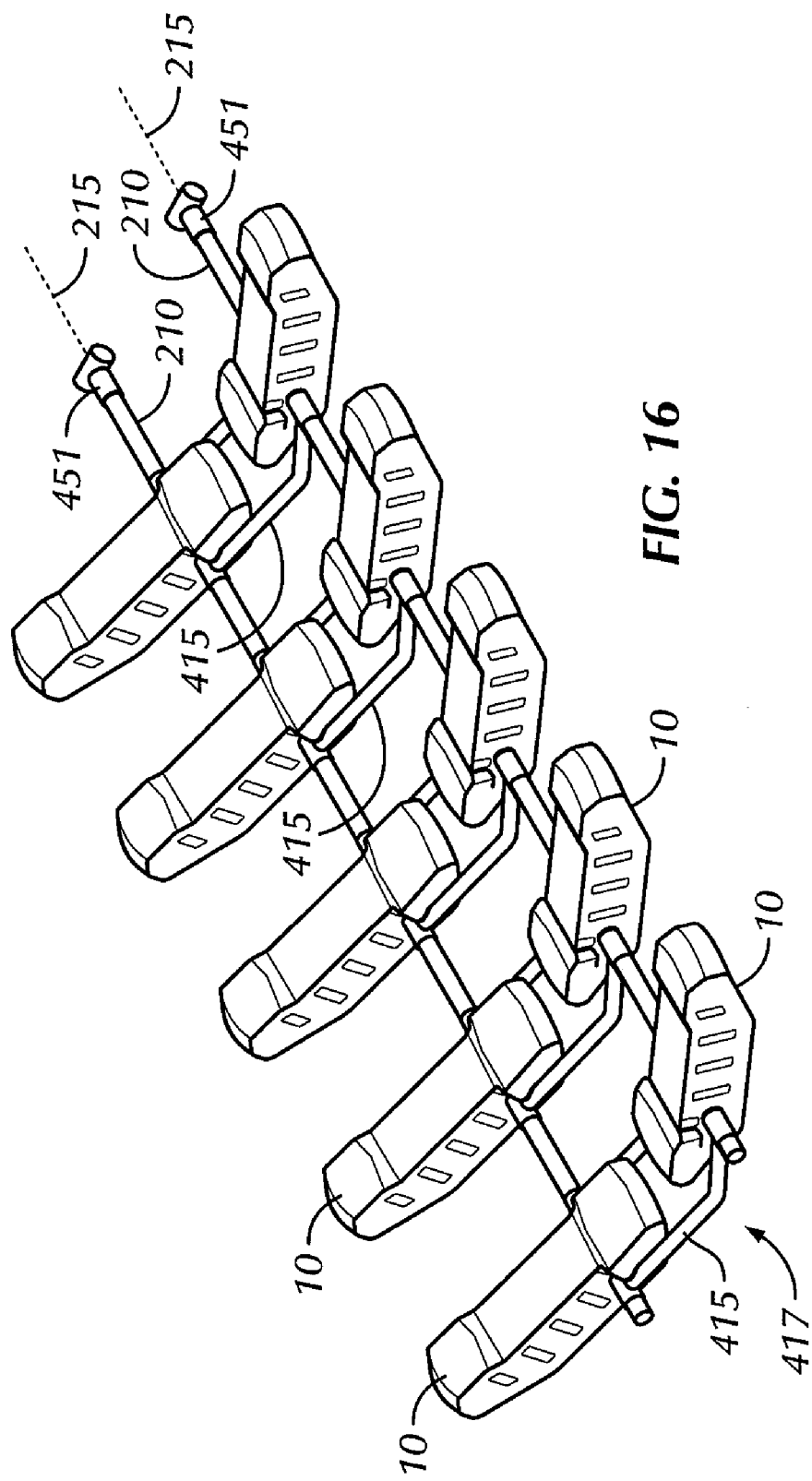
FIG. 16 is a perspective view showing the back portion of the apparatus shown in FIG. 15.

As shown in FIGS. 15 and 16, frame 400 (and, in this example, back portion 425 of frame 400) may include two substantially parallel longitudinal bars 210 that run through passageways 40 (not labeled in these figures) of float arms 10 (some of which are not labeled in FIGS. 15 and 16 for clarity). Thus, each float arm 10 is pivotally coupled to a longitudinal bar 210. As explained above, an axis 215 runs through each longitudinal bar 210 (and consequently through each passageway 40). As a result, each float arm is configured to pivot about (and, in this example, actually pivots about) an axis 215. As explained above, longitudinal bars 210 can each be constructed of one continuous piece of material, or multiple pieces of material.

In addition to being substantially parallel to and laterally spaced apart from each other, axes 215 are substantially perpendicular to lateral axis 450 and lateral trailer connection axis 480. A preferable lateral distance between axes 215 is 30 inches for a frame that is designed to accommodate the range of watercraft sizes discussed above. Axes 215 also are substantially parallel to the longitudinal axis of the watercraft that can come to rest on frame 400 when trailer 500 is loaded, meaning that when the watercraft is in place, the longitudinal axis of that watercraft will be aligned substantially parallel to each axis 215, and substantially perpendicular to lateral axis 450 and to lateral trailer connection axis 480.

Frame 400 (and, in this example, back portion 425 of frame 400) may include at least two (and, in this example, more than two) float arm stops 415. Only one float arm stop 415 is clearly visible near each float arm 10 in FIGS. 15 and 16, but a float arm stop 415 is positioned on each side of each float arm 10 such that the float arms 10 do not move along longitudinal bars 210. Float arm stops 415 (not all of which are labeled in FIGS. 15 and 16 for clarity) each include a brace portion 417 (which may be bent, as shown, in order to properly clear the relevant portions of the hull (e.g., the keel), including any skegs) and collars 419 coupled to brace portion 417. The depth of the bends of brace portions 417 may be 8 inches. A skeg tray, although not shown, may be attached (e.g., using bolts) to one or more of brace portions 417, and may be sized as discussed above. Brace portions 417 of float arm stops 415 may be schedule 40 2-inch (nominal) outer diameter, 1½-inch inner diameter pipe, and may be connected to collars 419, which may be made of 11-gauge 2-inch galvanized steel box tubing, in any suitable manner, such as by welding, nuts and bolts, or the like. Bolts, although not shown, may be placed through collars 419 and longitudinal bars 210 in order to couple float arm stops 415 to longitudinal bars 210. Furthermore, using bolts will fix the position of float arm stops 415 along longitudinal bars 210. Those of ordinary skill in the art will understand, however, that any suitable means of coupling float arm stops 415 to longitudinal bars 210 may be used. The portions of float arm stops 415 that are configured to contact one or more of the present float arms may be coated with a protective coating as discussed above. Float arm stops 415 not only function to prevent movement of float arms 10 along longitudinal bars 210, they also may serve (in connection with any rotation-restricting openings that are provided with a given float arm) to prevent too much rotation of a given float arm, and to stabilize frame 400 by keeping longitudinal bars 210 from spreading apart when a watercraft hull contacts opposing float arms.

Turning to front portion 475 of frame 400, each front bar 460 has an axis running through it (not shown), and those axes are substantially parallel to each other and to axes 215; they are also substantially perpendicular to lateral axis 450, lateral trailer connection axis 480, and the longitudinal axis of any watercraft that is loaded onto trailer 500. Front bars 460 may be spaced apart from each other by 30 inches (although other distances are possible, as depicted in FIG. 15). Front portion 475 of frame 400 (and, thus, frame 400) also may include lateral support bars 490 (which may be bent (having an exemplary depth of 8 inches), as shown, to provide sufficient clearance for the keel of the watercraft; or straight, where clearance is not a concern) that are each coupled to both front bars 460. Specifically, lateral support bars 490 include collars 499 that may be coupled using any suitable means to the brace portion 497 of each lateral support bar 490. Brace portions 497 may be made from the same material, and sized the same, as brace portions 417; collars 499 may be made from the same material, and sized the same, as collars 419; and brace portion 497 may be coupled to collars 499 in the same fashion that brace portion 417 may be coupled to collars 419. Furthermore, the same type of bolts used to coupled collars 419 to longitudinal bars 210 may be used to fixedly couple lateral support bars 490 to front bars 460.

As FIG. 17 shows, by virtue of the location of passageways 40 in the opposing float arms 10 in the pair shown, less than one half of the total mass (roughly denoted by dashed circle 95; e.g., approximately ⅓) of both float arms 10 can be positioned between longitudinal bars 210, and more than one half of the total mass (roughly denoted by the total of dashed circles 97; e.g., approximately ⅔) of both float arms 10 can be not positioned between longitudinal bars 210. This can be true for all pairs of float arms 10 that are pivotally coupled to frame 400. The resulting force conditions for the configuration shown in FIG. 17 may the same as are described above.

For a trailer 500 that is designed to accommodate watercraft (e.g., boats) that range in size as described above, the following exemplary dimensions may be used to construct the embodiment of apparatus 400 shown in FIGS. 15-16: float arms 10 may be constructed according to the details of the preferred embodiment shown in FIGS. 1-6; front bars 460 may be made from schedule 40 2-inch (nominal) outer diameter pipe; T-connectors 451 into which the ends of front bars 460 may be inserted and through which front lateral bar 477 may be threaded may be made from 11-gauge 2-inch galvanized steel box tubing and may have a longitudinal portion that is 2 inches long and a lateral portion that is 2 inches long; T-connectors 451 into which the ends of front bars 460 may be inserted and through which lateral joining bar 453 may be threaded may be made from the same material and have the same sized portions; front lateral bar 477 may be made from schedule 40 2-inch (nominal) outer diameter pipe, and approximately 2 inches of front lateral bar 477 may be placed through the openings in box wells 479; lateral joining bar 453 may be made from schedule 40 2-inch (nominal) outer diameter pipe; T-connector 505 may be made from 11-gauge galvanized steel, have an open (longitudinal) portion 503 that is 2 inches (nominal) in inner diameter; bracket 513 may be made from 11-gauge galvanized steel; T-connector 525 may be made from 11-gauge galvanized steel, have a longitudinal open portion 523 that is 2 inches (nominal) in inner diameter, and a lateral open portion 527 that is 2 inches (nominal) in inner diameter; bolts 530, which may also be used to connect the collars discussed above to longitudinal bars 210 or front bars 460, may be made from ⅜-inch ROLOC material; bolt 535 may be made from ½-inch ROLOC material; and the version of longitudinal bars 210 depicted in FIGS. 15-16 may be made from schedule 40 2-inch (nominal) outer diameter pipe.

Figure 18:
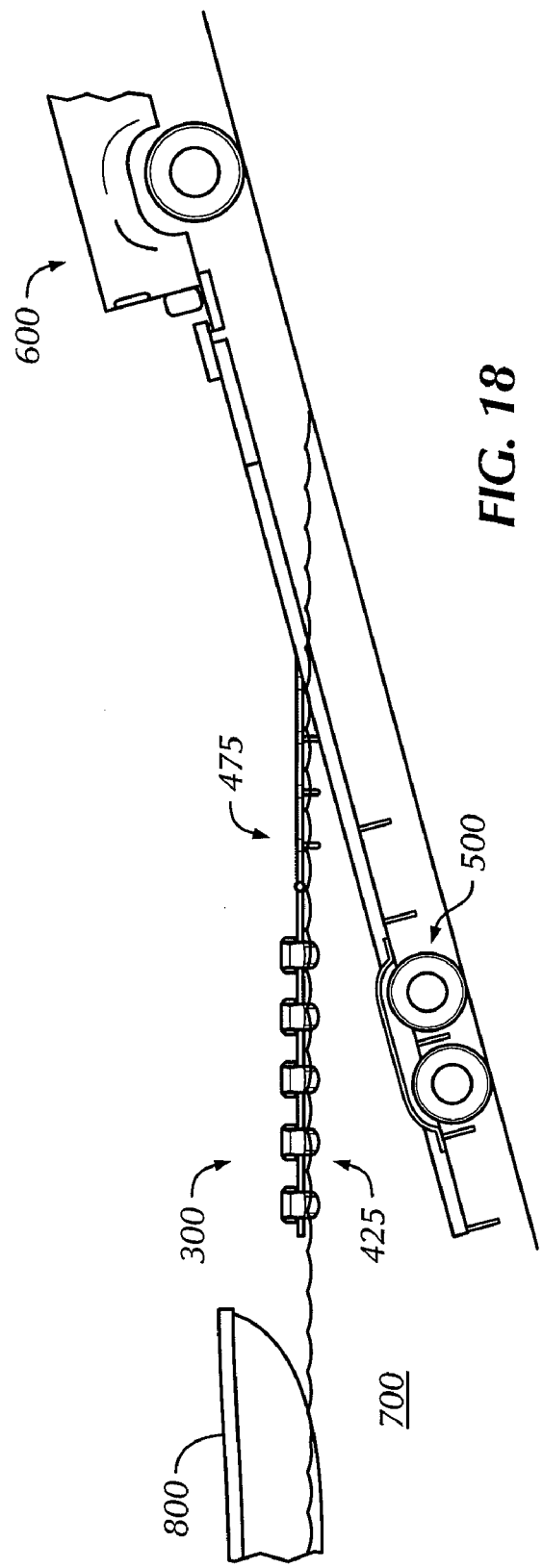
FIG. 18 is a side view showing the apparatus shown in FIG. 15 being backed down a ramp at a lake.

FIG. 18 is a side view showing generically (float arm stops 415 are not depicted) how the back and front portions of frame 400 of apparatus 300 function when trailer 500 is connected to a vehicle 600 and backed down a ramp into a body of water 700. As the figure shows, although back portion 425 is capable of pivoting with respect to front portion 475, once trailer 500 is backed down the ramp to a sufficient depth in the water, the two portions will be substantially level with each other. As a result, back portion 425 will be suspended by the float arms such that its longitudinal bars can be slightly out of the water (e.g., by about 4 inches). This, in turn, will keep the float arms "open" (meaning the inside and outside end top surfaces of the float arms will be facing substantially upwardly, or toward the sky) as boat 800 approaches. It will also give the boat operator an easier target than the submerged bunks he or she might otherwise be facing.

Figure 19:
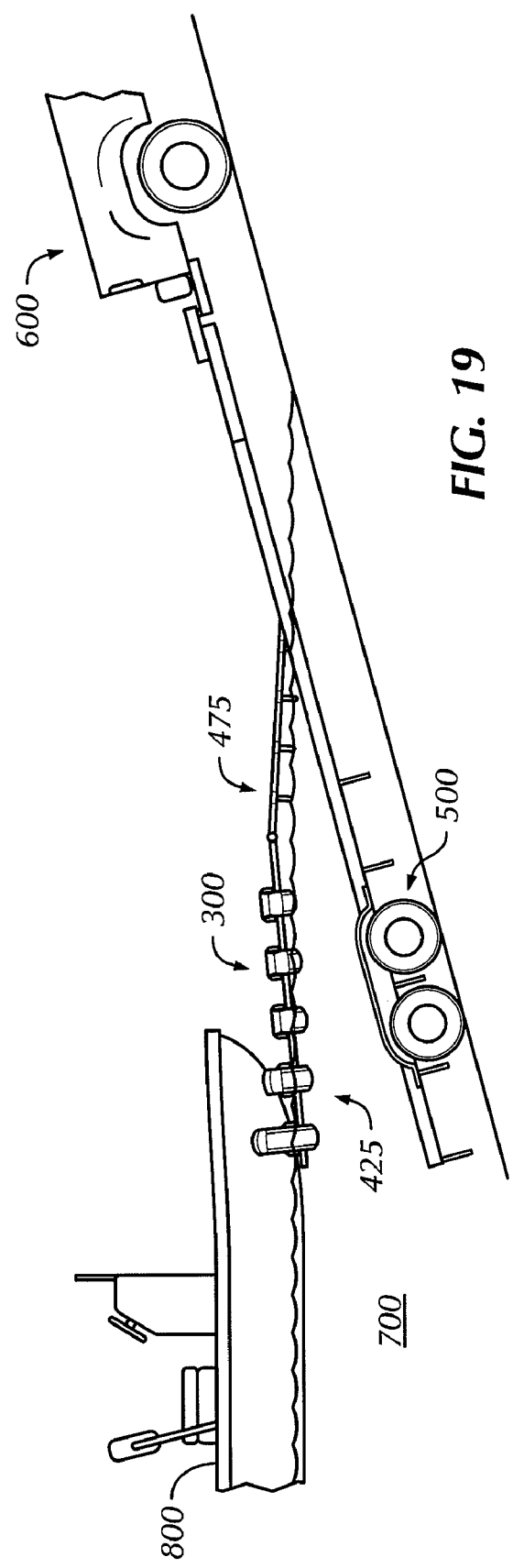
FIG. 19 is a side view showing a boat contacting the endmost float arms of the apparatus depicted in FIG. 18.

FIG. 19 shows boat 800 contacting the rearmost portion of frame 400 and the rearmost float arms reacting to that contact. As the figure shows, the outside ends of the float arms (and, more specifically, the outside end top surfaces) or of whichever of the float arms is first contacted may come into contact with the hull of the watercraft. That contact results from the inside end top surfaces (unlabeled in this figure) or surface contacting the hull of the watercraft first, causing the float arms to pivot and outside end top surfaces to "close." This pivoting action—which is a result of the boat hull forcing the inside end or ends of the first float arms into the water, and the water exerting a buoyant force on the outside end or ends of the first float arms—helps to center boat 800 over back portion 425. Once boat 800 is centered (or at least substantially centered) over apparatus 300, opposing float arms 10 will put equal (or at least substantially equal) pressure on boat 800. The same is true of the float arms that are used in the lift tank assembly embodiments discussed above. Float arms 10 that are pivotally coupled to back portion 425 will have the same desirable breaking effect on boat 800 that is described above with respect to float arms 10 of apparatus 100.

D. Embodiments of the Present Methods

The present methods include coupling any of the present apparatuses to any of the present frames, or portions of the present frames (e.g., longitudinal bars 210). The present methods also include contacting a watercraft (more particularly, the hull of the watercraft) with pivoting float arms that are positioned on different sides of the watercraft, the contacting tending to center the watercraft over a watercraft docking structure, and each float arm pivoting about an axis positioned in a passageway that is not centered along the length of the float arm. In certain embodiments of this particular method, the pivoting float arms include a first pivoting float arm that pivots about a first axis, and a second pivoting float arm that pivots about a second axis, the first and second axes being (i) spaced apart from each other, (ii) substantially parallel to each other, and (iii) substantially parallel to a longitudinal axis of the watercraft.

The present methods also include contacting one side of a hull of a watercraft moving in one direction with one or more first pivoting float arms, the watercraft moving in another direction as a result of, at least in part, the contacting; and contacting another side of the hull of a watercraft with one or more second pivoting float arms; the contacting one side and the contacting another side tending to center the watercraft over a trailer or a watercraft-lifting system.

The present methods also including centering (which does not require perfectly centering) a watercraft over a watercraft docking structure using pivoting float arms. The float arms may contact the watercraft more than any other feature of the watercraft docking structure during the centering.

The present methods also include placing (e.g., by steering) a hull of a watercraft on a buoyant arm (e.g., one manner of characterizing the present float arms); and causing at least a portion of the buoyant arm to rotate from the weight of the watercraft to help in centering the watercraft over a watercraft docking structure.

It should be understood that the present structures and methods are not intended to be limited to the particular forms disclosed. Rather, they are to cover all modifications, equivalents, and alternatives falling within the scope of the claims. For example, float arms have proportions similar to those of the embodiment of float arm 10 shown in FIGS. 1-6, but that are larger or smaller than the dimensions provided above, may be used to create float arms suitable for use with larger or smaller watercraft, respectively, than the watercraft described above. For example, by scaling down the size of float arms 10 from the exemplary dimensions provided above, personal watercraft (such as jet skis) having a beam of approximately 48 inches may be accommodated. The frames described above also may be scaled down to best fit a given application.

Furthermore, there are many ways to construct the present frames. For example, for some applications, a frame that comprises a single spine may be used. That is, the float arms that are utilized for some applications may be positioned along a single bar, instead of two bars as shown in the present figures. Furthermore, although the present 2-bar frame embodiments have members that connect the two longitudinal bars and keep them from separating (e.g., lateral bars 230 for frame 200 and float arm stops 415 for frame 400), other structures may be used to keep the two longitudinal bars from separating may be used. For example, a structure that is coupled to each longitudinal bar, and that do not directly link the two longitudinal bars, may be used to counter the lateral components of the force a watercraft would otherwise have on the longitudinal bars.

Figure 21A:
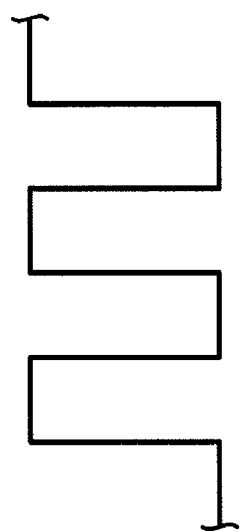
FIGS. 21A and 21B show structures that may be used consistently with the present frames.
Figure 21B:
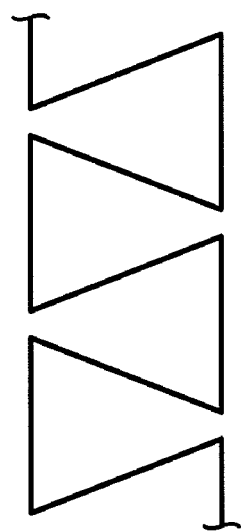

As yet another example, a single bar that includes laterally-offset longitudinal spine segments interconnected by parallel, spaced-apart lateral members (see FIG. 21A) may be used consistently with embodiments of the present frames. Embodiments of the present float arms may be placed along the laterally-offset longitudinal spine segments. In a similar embodiment, the lateral members may be angled to better ensure that float arms may be positioned opposite one another (see FIG. 21B).

Further still, the present apparatuses are suited for use with many different kinds of watercraft docking structures. Although floating lift tanks and trailers have been illustrated and described, other watercraft docking structures may also be used. For example, lift systems that include electrically-driven pulley systems may be used consistently with the present apparatuses.

The claims are not to be interpreted as including means-plus- or step-plus-function limitations, unless such a limitation is explicitly recited in a given claim using the phrase(s) "means for" or "step for," respectively.

I claim:

1. A method comprising:
   contacting a floating watercraft with pivoting float arms arranged in two groups that are positioned on different sides of a longitudinal axis of the watercraft, the contacting tending to center the watercraft between the two groups of float arms;
   each float arm having a length and pivoting about an axis that is not centered along the length of the float arm.

2. The method of claim 1, where one of the two groups includes a first pivoting float arm that pivots about a first axis, the other group includes and a second pivoting float arm that pivots about a second axis, and the first and second axes are: (i) spaced apart from each other, (ii) substantially parallel to each other, and (iii) substantially parallel to the longitudinal axis of the watercraft.

3. The method of claim 2, where each of the pivoting float arms in one of the groups pivots about the first axis, and each of the pivoting float arms in the other group pivots about the second axis.

4. The method of claim 1, where the pivoting float arms are pivotally coupled to a frame.

5. The method of claim 4, where the frame is configured to be pivotally coupled to a trailer.

6. The method of claim 4, where the frame is configured to pivotally coupled to a watercraft-lifting system.

7. The method of claim 4, where (i) the frame includes two substantially parallel bars, (ii) a first pivoting float arm in one of the two groups pivots about one of the substantially parallel bars, and (iii) a second pivoting float arm in the other group pivots about the other substantially parallel bar.

8. The method of claim 7, where one of the substantially parallel bars comprises different bars connected together.

9. The method of claim 7, where the first pivoting float arm includes a float arm passageway through which one of the substantially parallel bars runs, and the second pivoting float arm includes a second float arm passageway through which the other substantially parallel bar runs.

10. A method comprising:
    contacting one side of a hull of a watercraft moving in one direction with one or more first pivoting float arms, the watercraft moving in another direction as a result of at least in part, the contacting;
    where at least one of the first pivoting float arms has two ends and is configured to pivot about a first axis that is between the two ends and not centered between the two ends; and
    contacting another side of the hull of a watercraft with one or more second pivoting float arms;
    the contacting one side and the contacting another side tending to center the watercraft between the first and second pivoting float arms.

11. The method of claim 10, where at least one of the pivoting float arms in the second pivoting float arms pivots about a second axis, and the first and second axes are: (i) spaced apart from each other, (ii) substantially parallel to each other, and (iii) substantially parallel to a longitudinal axis of the watercraft.

12. The method of claim 10, where the first and second pivoting float arms are pivotally coupled to a frame.

13. The method of claim 12, where the frame is configured to be pivotally coupled to a trailer.

14. The method of claim 12, where the frame is configured to pivotally coupled to a watercraft-lifting system.

15. The method of claim 12, where (i) the frame includes two substantially parallel bars, (ii) at least one pivoting float arm in the first pivoting float arms pivots about one of the substantially parallel bars, and (iii) at least one pivoting float arm in the second pivoting float arms pivots about the other substantially parallel bar.

16. The method of claim 15, where one of the substantially parallel bars comprises different bars connected together.

17. The method of claim 15, where at least one pivoting float arm in the first pivoting float arms includes a float arm passageway through which one of the substantially parallel bars runs, and at least one pivoting float arm in the second pivoting float arms includes a second float arm passageway through which the other substantially parallel bar runs.

18. A method comprising:
    placing a hull of a watercraft in contact with a buoyant arm; and
    causing at least a portion of the buoyant arm to rotate from the weight of the watercraft to help in centering the watercraft over a watercraft docking structure, the rotation occurring about an axis that is between, but not centered between, two ends of the buoyant arm.

19. The method of claim 18, where the watercraft docking structure includes a frame pivotally coupled to a trailer.

20. The method of claim 18, where the watercraft docking structure includes a frame coupled to a watercraft-lifting system.

* * * * *